(12) United States Patent
Kitamura

(10) Patent No.: US 7,440,629 B2
(45) Date of Patent: Oct. 21, 2008

(54) IMAGE ENCODING APPARATUS AND IMAGE ENCODING METHOD

(75) Inventor: Shinji Kitamura, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 676 days.

(21) Appl. No.: 11/001,078

(22) Filed: Dec. 2, 2004

(65) Prior Publication Data

US 2005/0147307 A1 Jul. 7, 2005

(30) Foreign Application Priority Data

Dec. 19, 2003 (JP) ............................. 2003-423803
Nov. 17, 2004 (JP) ............................. 2004-332655

(51) Int. Cl.
*G06K 9/36* (2006.01)

(52) U.S. Cl. .................................... 382/238

(58) Field of Classification Search ......... 382/232–233, 382/236, 248, 250–251; 348/394.1–395.1, 348/400.1–401.1, 409.1–421.1, 430.1–431.1; 375/240.12–240.24
See application file for complete search history.

(56) References Cited

U.S. PATENT DOCUMENTS

| | | | |
|---|---|---|---|
| 5,574,184 A | | 11/1996 | Wu et al. |
| 5,974,184 A | * | 10/1999 | Eifrig et al. .................. 382/236 |
| 6,005,622 A | * | 12/1999 | Haskell et al. ......... 375/240.24 |
| 6,647,061 B1 | * | 11/2003 | Panusopone et al. ... 375/240.12 |
| 6,792,046 B2 | * | 9/2004 | Hatano et al. .......... 375/240.24 |

* cited by examiner

*Primary Examiner*—Jose L Couso
(74) *Attorney, Agent, or Firm*—McDermott Will & Emery LLP

(57) ABSTRACT

In the image encoding apparatus, the bus traffic monitoring unit monitors the traffic of the memory bus and when the memory bus is congested, the prediction selector is instructed to select the output from the DC prediction unit. Conversely, when the memory bus is not congested, the prediction selector is instructed to select the output from the AC prediction unit. The memory unit stores therein DC coefficients and AC coefficients outputted from the DCT unit so that AC prediction encoding can be performed.

13 Claims, 15 Drawing Sheets

FIG.2
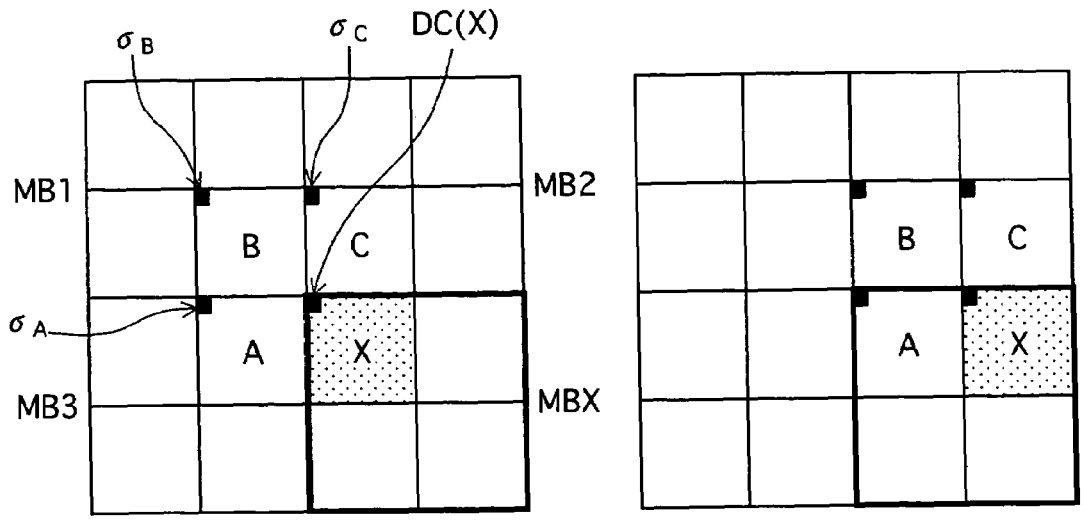
(1) WHEN PREDICTION TARGET BLOCK X IS AT TOP LEFT
(2) WHEN PREDICTION TARGET BLOCK X IS AT TOP RIGHT
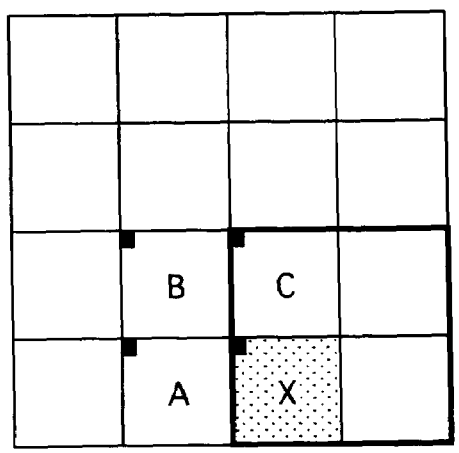
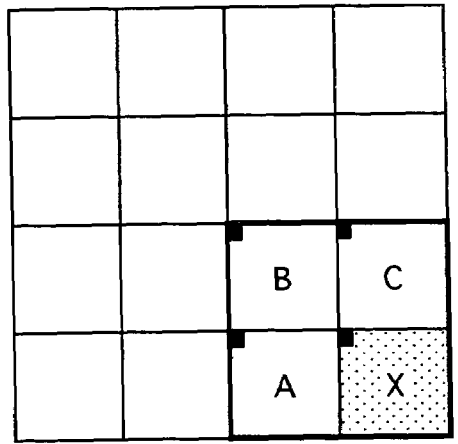
(3) WHEN PREDICTION TARGET BLOCK X IS AT BOTTOM LEFT
(4) WHEN PREDICTION TARGET BLOCK X IS AT BOTTOM RIGHT
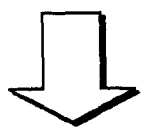
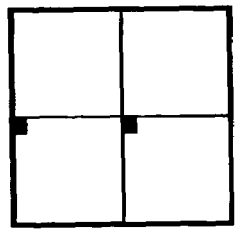
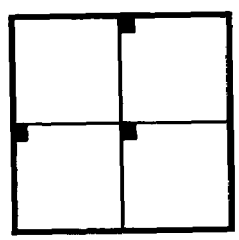
ADJACENT MB POSITIONED ABOVE NEEDS TWO DC COEFFICIENTS
ADJACENT MB POSITIONED ON THE LEFT NEEDS THREE DC COEFFICIENTS

IMAGE ENCODING APPARATUS AND IMAGE ENCODING METHOD

CROSS-REFERENCE TO RELATED APPLICATIONS

This application is based on applications No. 2003-423803 and No. 2004-332655 filed in Japan, the contents of which are hereby incorporated by reference.

BACKGROUND OF THE INVENTION (1) Field of the Invention

The present invention relates to image encoding apparatuses and image encoding methods for encoding moving pictures, and in particular to a technique to improve the image quality of decoded moving pictures.

(2) Description of the Related Art

In recent years, technology development and standardization of standards have been actively taking place for techniques e. g. JPEG (Joint Photographic Experts Group) and MPEG (Moving Picture Experts Group) that are used to compress/encode moving picture data, for the purpose of transmitting and receiving moving pictures with the use of the Internet and mobile phones and saving moving picture data with digital video cameras.

Among methods of compressing/encoding moving picture data are inter-frame prediction encoding and intra-frame prediction encoding. The inter-frame prediction encoding makes use of relativity between sequential frames in a moving picture. The intra-frame prediction encoding makes use of relativity between pixels that are positioned adjacent with each other in a frame. Between these two, Discrete Cosine Transform (DCT) is widely used for the intra-frame prediction encoding.

For the compressing/encoding processing with the use of Discrete Cosine Transform, DC (Direct Current) components of DCT coefficients have been conventionally used; however, in recent years, AC (Alternating Current) components are also used in addition to DC components. The following documents may be referenced for some examples.

ISO/IEC 14496-1 Information Technology—Coding of Audio Visual Objects—Part 1: Systems.

ISO/IEC 14496-2 Information Technology—Coding of Audio Visual Objects—Part 2: Visual.

In the following description, the compressing/encoding with the use of DC components will be referred to as "DC prediction encoding", whereas the compressing/encoding with the use of both DC components and AC components will be referred to as "AC prediction encoding".

When an AC prediction encoding method is used, encoding efficiency is improved compared to when a DC prediction encoding method is used, and the image quality of decoded moving pictures becomes extremely higher. There is, however, a problem that a large memory capacity is required for the processing with AC prediction encoding, and the processing load is high. For this reason, it is a reality that prediction encoding with AC coefficients is used only for small images having small amounts of data, and large images are compressed/encoded with the use of prediction encoding with DC coefficients.

As it is apparent from the fact that many different models of devices such as portable phones and digital cameras start having a larger number of pixels, there is a very high demand for making image quality higher. Consequently, there is a need to improve, with appropriate measures, image quality of large images to which a DC prediction encoding method has conventionally been applied.

Further, AC prediction encoding also has problems. For example, since the processing load is high, the use of AC prediction encoding is avoided in cases where realtime-ness is required, and the image quality therefore cannot be improved. Another problem is that when AC prediction encoding is profusely used in order to prioritize image quality, realtime-ness will be lost (e. g. a frame drop will occur). These problems also tell us that there is a need to make image quality higher with appropriate measures.

SUMMARY OF THE INVENTION

The present invention is made in view of the situations and problems described above. An object of the present invention is to improve quality of images encoded with the use of intra-frame prediction encoding.

In order to achieve the object, the present invention provides an image encoding apparatus comprising: a selecting unit operable to select, according to an operational state of the image encoding apparatus, one of a direct-current prediction encoding method and an alternating-current prediction encoding method; a DC prediction encoding unit operable to, when the direct-current prediction encoding method is selected, perform direct-current prediction encoding for each of blocks constituting a piece of image data; and an AC prediction encoding unit operable to, when the alternating-current prediction encoding method is selected, perform alternating-current prediction encoding for each of blocks constituting a piece of image data.

With this arrangement, the image encoding apparatus switches between the encoding methods according to the operational state which indicates whether or not the realtime-ness of data processing of moving pictures; therefore, it is possible to avoid degradation of image quality such as a frame drop.

In such a case, the image encoding apparatus may comprise a monitoring unit operable to monitor the operational state of the image encoding apparatus, wherein the selecting unit makes the selection of the one of the direct-current and alternating-current prediction encoding methods according to a result of the monitoring performed by the monitoring unit.

The image encoding apparatus of the present invention may comprise a memory that is commonly used for both encoding processing and other kinds of processing, wherein the AC prediction encoding unit performs alternating-current prediction encoding using AC coefficients stored in the memory, the monitoring unit monitors an amount of accesses to the memory, and the selecting unit selects the direct-current prediction encoding method in a case where the monitoring unit judges that the amount of the accesses to the memory is equal to or larger than a value and selects the alternating-current prediction encoding method in a case where the monitoring unit judges that the amount of the accesses to the memory is smaller than the value.

When AC prediction encoding is performed, it is necessary that accesses are made to the memory more frequently than when DC prediction encoding is performed. According to the present invention, it is possible to avoid delays in prediction encoding processing caused by contention of accesses to the memory. When there is no access contention, AC prediction encoding is performed; therefore, it is possible to expect the image quality to be higher than in the case where only DC prediction encoding is performed.

Further, it is also possible to avoid the situation where other kinds of processing besides the encoding processing that use the memory is delayed due to contention of accesses to the memory.

The image encoding apparatus of the present invention may have an arrangement wherein the monitoring unit monitors an amount of codes generated by the AC prediction encoding unit and the DC prediction encoding unit, and the selecting unit selects the alternating-current prediction encoding method in a case where the monitoring unit judges that the amount of the generated codes is equal to or larger than a value and selects the direct-current prediction encoding method in a case where the monitoring unit judges that the amount of the generated codes is smaller than the value.

When AC prediction encoding is performed, it is possible to expect compression efficiency to be higher than when DC prediction encoding is performed. According to the present invention, when the amount of the generated code is large, AC prediction encoding is performed so that the generated code amount is suppressed to be low and thereby the image quality can be high; whereas when the amount of the generated code is small, DC prediction encoding is performed so that the encoding processing is performed while realtime-ness is highly valued (i. e. avoid frame drops).

The image encoding apparatus of the present invention may have an arrangement wherein the monitoring unit monitors a length of time having been taken to encode a predetermined amount of image data, and the selecting unit selects the direct-current prediction encoding method in a case where the monitoring unit judges that the length of time is equal to or longer than a value and selects the alternating-current prediction encoding method in a case where the monitoring unit judges that the length of time is shorter than the value.

When DC prediction encoding is performed, since the processing amount is smaller than when AC prediction encoding is performed, the time taken to encode a predetermined amount of image data is expected to be shorter. According to the present invention, when the time taken to encode the predetermined amount of image data is long, DC prediction encoding is performed so that the time taken to perform the encoding processing is shortened and thereby it is possible to avoid frame drops. When the time taken to perform the encoding processing is short, AC prediction encoding is performed so that the image quality is high.

In addition to the arrangement above, it is acceptable to have an arrangement wherein the monitoring unit monitors the operational state of the image encoding apparatus for each of frame periods, or wherein the monitoring unit monitors the operational state of the image encoding apparatus for each of block line periods.

Alternatively, it is acceptable to have an arrangement wherein the selecting unit makes the selection of the one of the direct-current and alternating-current prediction encoding methods for each of frames, or wherein the selecting unit makes the selection of the one of the direct-current and alternating-current prediction encoding methods for each of block lines. It is further acceptable to have an arrangement wherein the selecting unit makes the selection of the one of the direct-current and alternating-current prediction encoding methods for each of macro-blocks.

The image encoding apparatus of the present invention may comprise a dedicated memory that is used only by the DC prediction encoding unit, wherein the DC prediction encoding unit performs direct-current prediction encoding using DC coefficients stored in the dedicated memory.

With this arrangement, when DC prediction encoding is performed, there is no access made to the memory; therefore, it is possible to fully achieve the aforementioned effect. It should be noted that since such a dedicated memory needs to store therein only DC coefficients required for DC prediction encoding processing, it is acceptable that the dedicated memory has a relatively small storage capacity; therefore, there is a large cost merit.

The present invention further provides an image encoding method to be used by an image encoding apparatus, comprising: a monitoring step of monitoring an operational state of the image encoding apparatus; a selecting step of selecting, according to the operational state of the image encoding apparatus, one of a direct-current prediction encoding method and an alternating-current prediction encoding method; a DC prediction encoding step of, when the direct-current prediction encoding method is selected, performing direct-current prediction encoding for each of blocks constituting a piece of image data; and an AC prediction encoding step of, when the alternating-current prediction encoding method is selected, performing alternating-current prediction encoding for each of blocks constituting a piece of image data.

With this arrangement, it is possible to avoid degradation of image quality, such as a frame drop, that is caused by the operational state of the image encoding apparatus.

The present invention further provides an image sensor system comprising: an image forming unit operable to form an image of an object; a photoelectric converting unit operable to perform a photoelectric conversion on the image of the object and output an analog image signal; an A/D converting unit operable to convert the analog image signal into a digital image signal; and an image processing unit that is operable to process the digital image signal and includes: a selecting subunit operable to select, according to an operational state of the image sensor system, one of a direct-current prediction encoding method and an alternating-current prediction encoding method; a DC prediction encoding subunit operable to, when the direct-current prediction encoding method is selected, perform direct-current prediction encoding for each of blocks constituting the digital image signal; and an AC prediction encoding subunit operable to, when the alternating-current prediction encoding method is selected, perform alternating-current prediction encoding for each of blocks constituting the digital image signal.

In addition, the present invention also provides an image processing system comprising: an A/D converting unit operable to receive an analog image signal and convert the received analog image signal into a digital image signal; and an image processing unit that is operable to process the digital image signal and includes: a selecting subunit operable to select, according to an operational state of the image processing system, one of a direct-current prediction encoding method and an alternating-current prediction encoding method; a DC prediction encoding subunit operable to, when the direct-current prediction encoding method is selected, perform direct-current prediction encoding for each of blocks constituting the digital image signal; and an AC prediction encoding subunit operable to, when the alternating-current prediction encoding method is selected, perform alternating-current prediction encoding for each of blocks constituting the digital image signal.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 2 is a schematic drawing that shows how DC prediction coefficients are generated by the DC prediction unit 105 according to the first embodiment;

DESCRIPTION OF THE PREFERRED EMBODIMENTS

The following describes embodiments of image encoding apparatuses of the present invention, with reference to the drawings.

1. First Embodiment

The image encoding apparatus of the first embodiment prevents degradation of image quality, such as a frame drop, resulting from memory access contention that occurs inside the apparatus.

1-1. Configuration of the Apparatus

Figure 1:
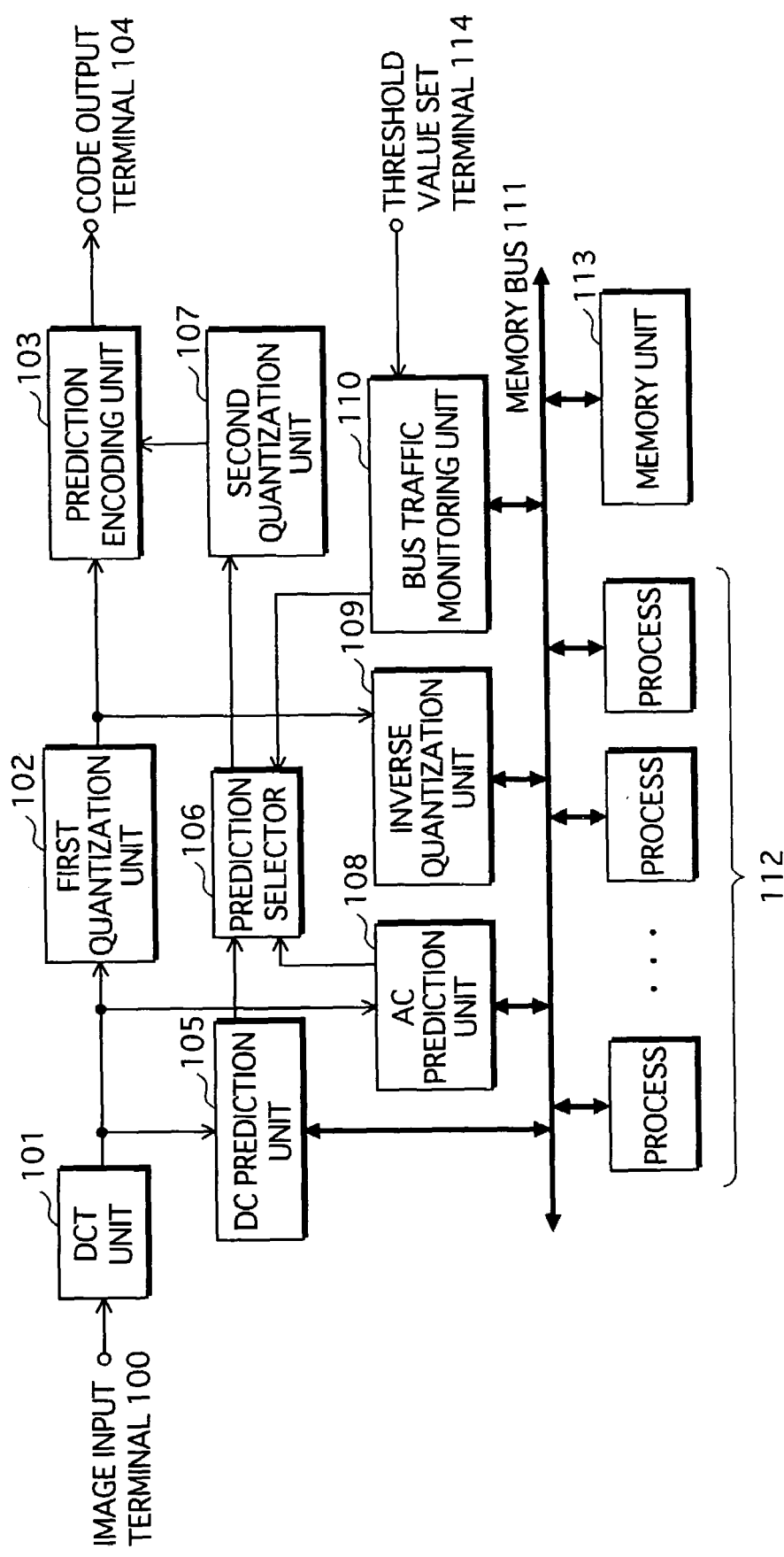
FIG. 1 is a block diagram that shows the principal functional configuration of an image encoding apparatus according to the first embodiment of the present invention.

FIG. 1 is a block diagram that shows the principal functional configuration of the image encoding apparatus according to the present embodiment. As shown in FIG. 1, the image encoding apparatus 1 comprises: an image input terminal 100, a DCT unit 101, a first quantization unit 102, a prediction encoding unit 103, a code output terminal 104, a DC prediction unit 105, a prediction selector 106, a second quantization unit 107, an AC prediction unit 108, an inverse quantization unit 109, a bus traffic monitoring unit 110, a memory bus 111, a group of processes 112, and a memory unit 113.

The image input terminal 100 receives an input of image signals in units of blocks, each of which has pixels arranged in eight rows by eight columns.

The DCT unit 101 performs Discrete Cosine Transform on the block image received by the image input terminal 100 and outputs DCT coefficients (a frequency component).

The first quantization unit 102 quantizes the DCT coefficients outputted by the DCT unit 101 and outputs quantized DCT coefficients.

The memory bus 111 is a bus used by the DC prediction unit 105, the AC prediction unit 108, the group of processes 112, and the like, in order to access the memory unit 113.

The inverse quantization unit 109 inversely quantizes the quantized DCT coefficients outputted by the first quantization unit 102 so as to generate DCT coefficients and stores the generated DCT coefficients into the memory unit 112 via the memory bus 111.

The memory unit 113 stores therein the DCT coefficients generated by the inverse quantization unit 109 and other data. In the present embodiment, an SDRAM (Synchronous Dynamic Random Access Memory) is used as the memory unit 113.

The DC prediction unit 105 refers to the DCT coefficients stored in the memory unit 113 via the bus 111 so as to generate DC prediction coefficients and outputs the generated DC prediction coefficients to the prediction selector 106.

The AC prediction unit 108 refers to the DCT coefficients stored in the memory unit 113 via the bus 111 so as to generate AC prediction coefficients and outputs the generated AC prediction coefficients to the prediction selector 106.

The group of processes 112 is made up of functional blocks that perform various kinds of processing other than image compressing/encoding. Each process accesses the memory unit 113 via the memory bus 111. It means that some processes may be in contention with each other for accessing the memory unit 113.

The bus traffic monitoring unit 110 monitors the state of accesses to the memory unit 113 via the memory bus 111. In the present embodiment, the bus traffic monitoring unit 110 monitors the state of accesses by referring to chip select signals of processes included in the group of processes 112, judges whether or not the memory bus 111 is congested, and outputs a select signal to the prediction selector 106.

The prediction selector 106 selects either DC prediction coefficients or AC prediction coefficients according to the select signal outputted by the bus traffic monitoring unit 110 and outputs the selected coefficients to the second quantization unit 107.

The second quantization unit 107 quantizes the DC or AC prediction coefficients received from the prediction selector 106 and outputs the quantized coefficients to the prediction encoding unit 103.

The prediction encoding unit 103 performs prediction encoding on the quantized DC or AC prediction coefficients that have been received, so as to generate DC or AC prediction codes.

The code output terminal 104 outputs the DC or AC prediction code generated by the prediction encoding unit 103.

1-2. The Operation Performed by the DC Prediction Unit 105

The following describes the operation performed by the DC prediction unit 105 according to the present embodiment. The DC prediction unit 105 generates DC prediction coefficients in compliance with the MPEG-4 standard. FIG. 2 is a schematic drawing that shows how DC prediction coefficients are generated by the DC prediction unit 105.

In FIG. 2 (1), the macro-block X, i. e. "MBX" (hereafter "macro-block" will be referred to as "MB") is made up of DCT coefficients (16 times 16 coefficients) for a macro-block being a target in the processing performed by the DC prediction unit 105. Each of MB1, MB2, and MB3 is made up of DCT coefficients for a macro-block positioned adjacent to MBX.

Firstly, explanation is provided for a case where the DC prediction unit 105 generates a prediction coefficient $\sigma_P$ to be applied to the DC coefficient DC (X) of the block X which is a part of MBX. In order to generate the prediction coefficient $\sigma_P$, the DC prediction unit 105 refers to the DC coefficients $\sigma_A$, $\sigma_B$, $\sigma_C$, respectively of the block A, the block B, and the block C that are each positioned adjacent to the block X. The prediction coefficient $\sigma_P$ is determined using the gradients of the DC coefficients $\sigma_A$, $\sigma_B$, $\sigma_C$. More specifically, $\sigma_C$ is taken as $\sigma_P$, when $|\sigma_A-\sigma_B|<|\sigma_B-\sigma_C|$ $\sigma_A$ is taken as $\sigma_P$, when $|\sigma_A-\sigma_B|\geq|\sigma_B-\sigma_C|$ Using the prediction coefficient Op determined in this way as well as the DC coefficient of the block X, which is DC (X), the prediction encoding unit 103 performs variable length encoding on the difference of these two according to the following formula:

$$\Delta X=(DC(X)-\sigma_P)/\_i\ dc\_scaler$$

where dc_scaler is a quantization parameter for the macro-block MBX.

Depending on the position of the block X for which a prediction coefficient $\sigma_P$ is to be generated, the positions of the blocks to be referred to will be different. In FIG. 2(2), FIG. 2(3) and FIG. 2(4), the positions of the blocks A, B, and C to be referred to are shown for each of different positions of block X in the macro-block MBX. It should be noted that the number of DC coefficients to be referred to varies depending on the position of the macro-block MBX.

As explained above, in order to perform DC prediction encoding, DC coefficients of a macro-block on which prediction encoding has already been performed are required. Consequently, DC coefficients of a macro-block on which prediction encoding has been performed are stored temporarily in the memory unit 113.

Figure 3:
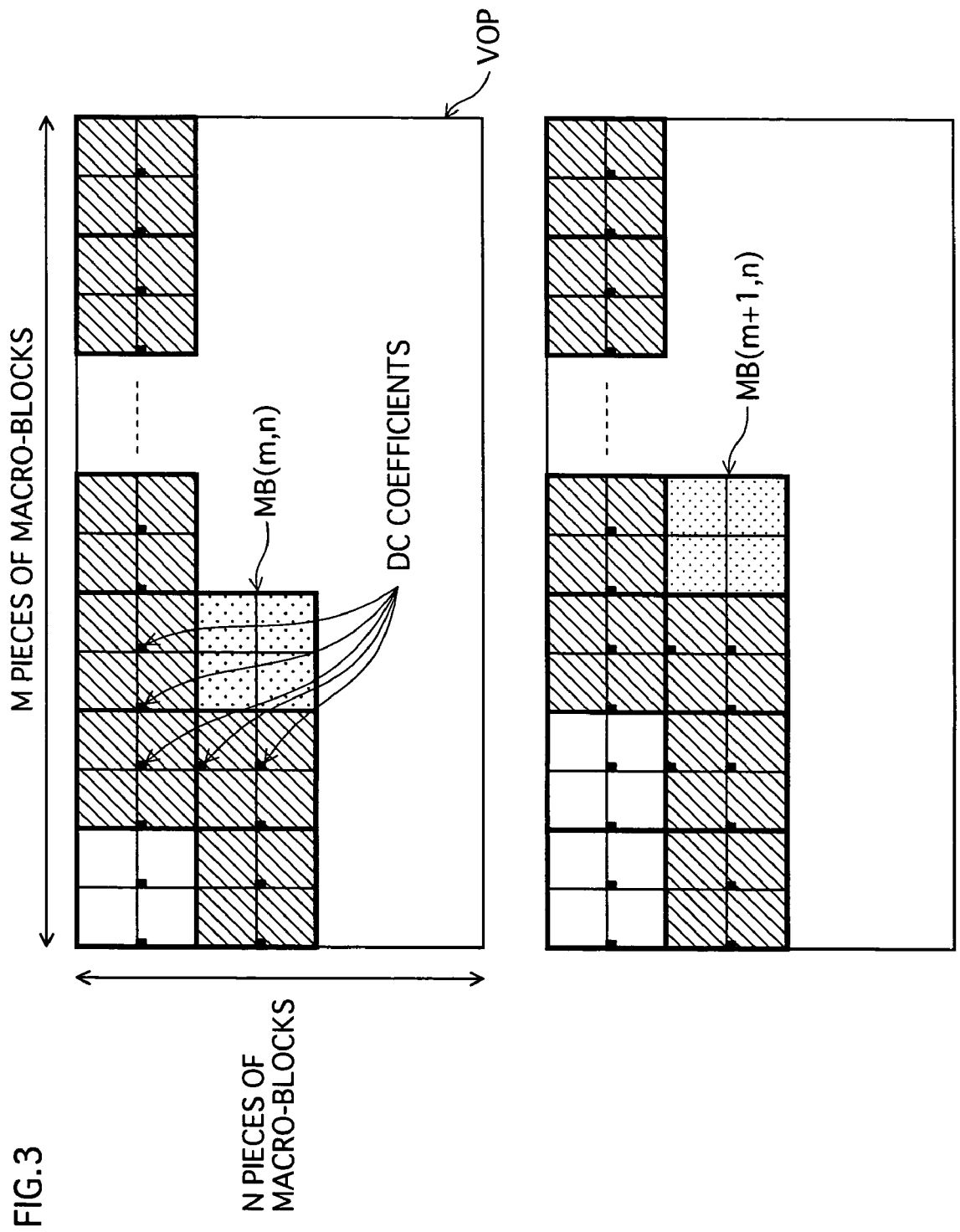
FIG. 3 shows DC coefficients that need to be stored in order to perform DC prediction encoding on an image made up of "M×N" pieces of macro-blocks.

To summarize, in order to perform DC prediction encoding, DC coefficients of other blocks need to be referred to, and these DC coefficients need to be stored in the memory unit 113. FIG. 3 illustrates DC coefficients that need to be stored in order to perform DC prediction encoding on an image made up of "M×N" pieces of macro-blocks.

In the following description, a macro-block that is at the m'th position in the scanning direction and at the n'th position in the subscanning direction from the starting point of the image will be expressed as MB(m, n).

As shown in FIG. 3, in an image made up of "M×N" pieces of macro-blocks, in order to perform DC prediction encoding on the macro-block MB (m, n), which is indicated with small dots, DC coefficients of the adjacent macro-blocks MB (m−1, n−1), MB (m, n−1), and MB (m−1, n) are required.

As another example, in order to perform DC prediction encoding on the macro-block MB (m+1, n), DC coefficients of the macro-blocks MB (m, n−1), MB (m+1, n−1), and MB (m, n−1) are required.

In other words, in order to perform DC prediction encoding sequentially, it is necessary to have the memory unit 113 store therein as many as 2*(M+1)+1 DC coefficients of M+1 pieces of macro-blocks which are diagonally shaded in FIG. 3.

1-3. The Operation Performed by the AC Prediction Unit 108

Figure 4:
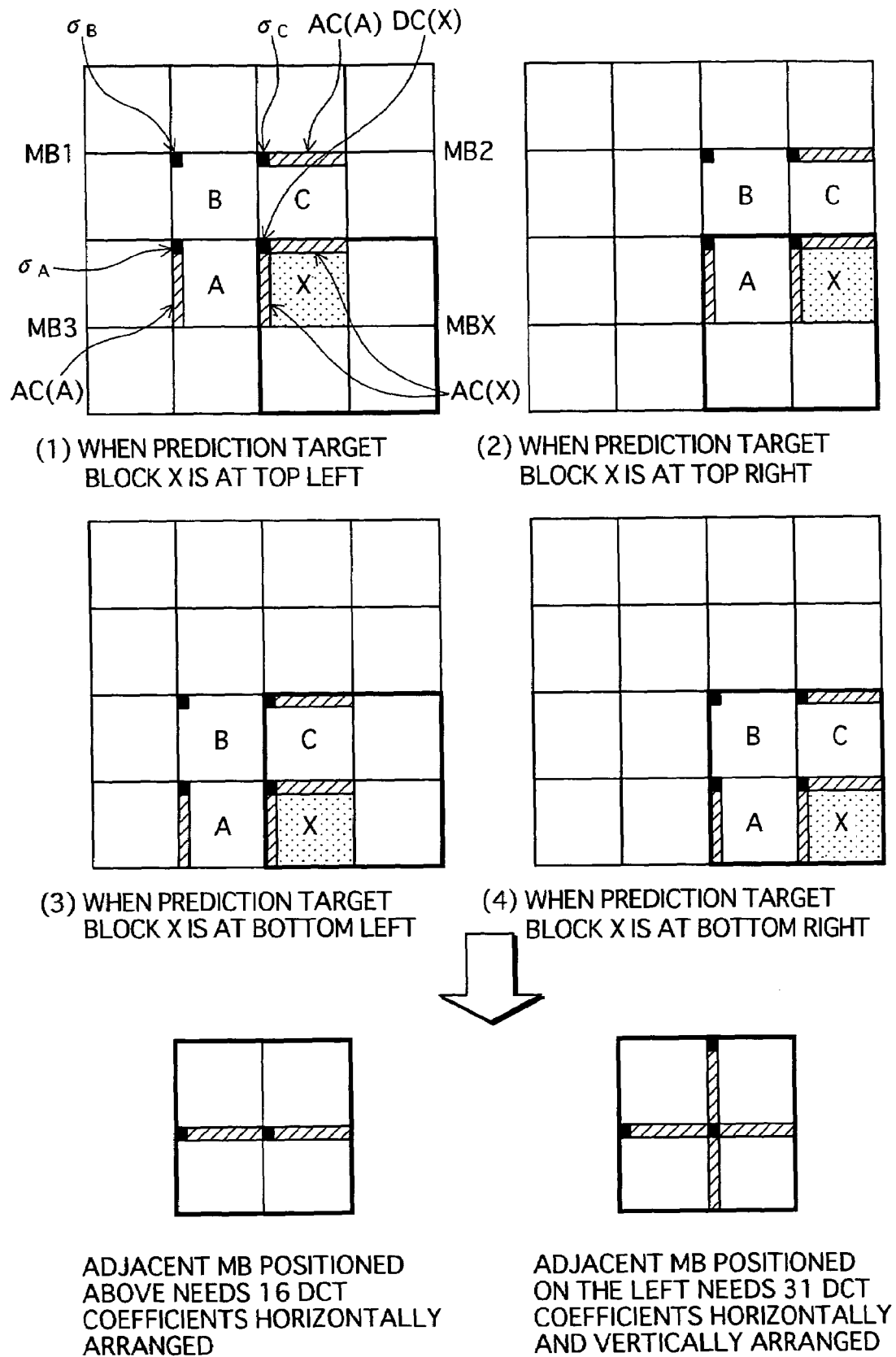
FIG. 4 is a schematic drawing that shows how AC prediction coefficients are generated by the AC prediction unit 108 according to the first embodiment.

The following describes the operation performed by the AC prediction unit 108 according to the present embodiment. The AC prediction unit 108 generates AC prediction coefficients in compliance with the MPEG-4 standard. FIG. 4 is a schematic drawing that shows how AC prediction coefficients are generated by the AC prediction unit 108.

In FIG. 4(1), MBX is made up of DCT coefficients (16 times 16 coefficients) for a macro-block being a target in the processing performed by the AC prediction unit 108. Each of MB1, MB2, and MB3 is made up of DCT coefficients for a macro-block positioned adjacent to MBX. The block X is a part of the macro-block MBX. The blocks A, B, and C are each a part of the macro-blocks MB3, MB1, and MB2, respectively.

The AC prediction unit 105 uses (i) the AC coefficient of the block C, which is AC (C) and (ii) the AC coefficient of the block A, which is AC(A) as prediction values for the AC coefficient of the block X, which is AC(X), and performs variable length encoding on each of the differences (prediction errors) between the AC(X) and the prediction values.

It should be noted that depending on the position of the block X being a target in AC prediction encoding, the positions of the blocks to be referred to will be different. In FIG. 4(2), FIG. 4(3) and FIG. 4(4), the positions of the blocks A, B, and C to be referred to are shown for each of different positions of block X in the macro-block MBX. It should be noted that the number of AC coefficients to be referred to varies depending on the position of the macro-block MBX.

As explained above, in order to perform AC prediction encoding, AC coefficients of other blocks need to be referred to and need to be stored in the memory unit 113. For example, in order to perform AC prediction encoding on an image made up of "M×N" pieces of macro-blocks, it is necessary to have the memory unit 113 store therein as many as 16*(M+1)+16 AC coefficients. Accordingly, in order to have necessary AC coefficients stored, it is required to have a much larger memory area than in the case where DC prediction encoding is performed.

1-4. The Operation Performed by the Image Encoding Apparatus 1

The following describes the operation performed by the image encoding apparatus 1.

Figure 5:
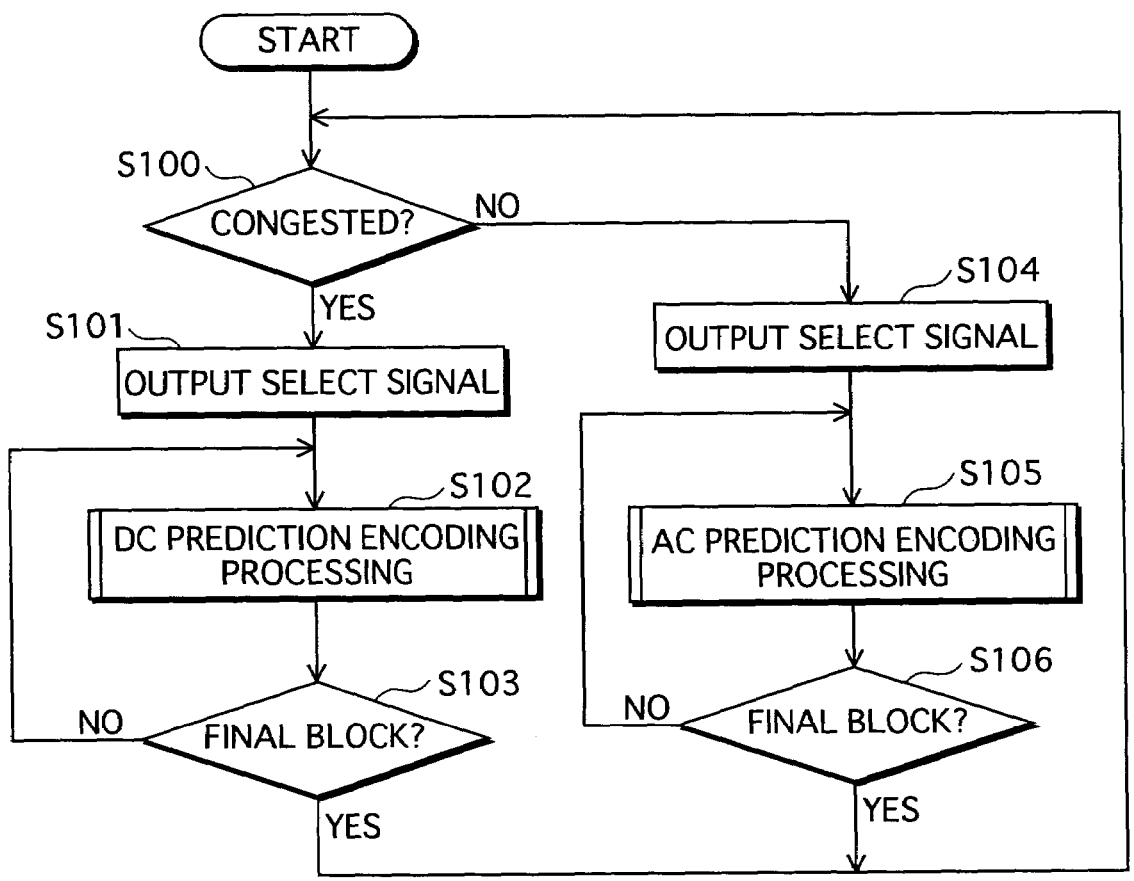
FIG. 5 is a flowchart that shows the flow of the processing performed by the image encoding apparatus 1 according to the first embodiment.

FIG. 5 is a flowchart that shows the flow of the processing performed by the image encoding apparatus 1 according to the present embodiment.

As shown in FIG. 5, in the image encoding apparatus 1, the bus traffic monitoring unit 110 judges the level of congestion of the memory bus 111, before prediction encoding is performed. When it is judged that the memory bus 111 is congested (Step S100: YES), the bus traffic monitoring unit 110 inputs a select signal to the prediction selector 106, so that the output from the DC prediction unit 105 is selected (Step S101).

In other words, when it is judged that the memory bus 111 is congested due to memory accesses from the group of processes 112, DC prediction encoding is performed (Step S102) so that those memory accesses are impeded as little possible.

It is because, as explained above, the number of DC coefficients required to be stored in the memory unit 113 for performing DC prediction encoding is smaller than the number of AC coefficients required to be stored for performing AC prediction encoding.

DC prediction encoding processing is performed in units of blocks, as mentioned above, and repeated while the processing of the final block has not been completed yet (Step S103: NO). When the processing of the final block is completed (Step S103: YES), the procedure returns to Step S100 where the level of congestion of the memory bus 111 is judged.

On the other hand, when the bus traffic monitoring unit 110 has judged that the memory bus 111 is not congested (Step S100: NO), the bus traffic monitoring unit 110 inputs a select signal to the prediction selector 106, so that the output from the AC prediction unit 108 is selected (Step S104).

AC prediction encoding processing is performed in units of blocks (Step S105) and repeated while the processing of the final block has not been completed yet (Step S106: NO). When the processing of the final block is completed (Step S106: YES), the procedure returns to Step S100 where the level of congestion of the memory bus 111 is judged.

Figure 6:
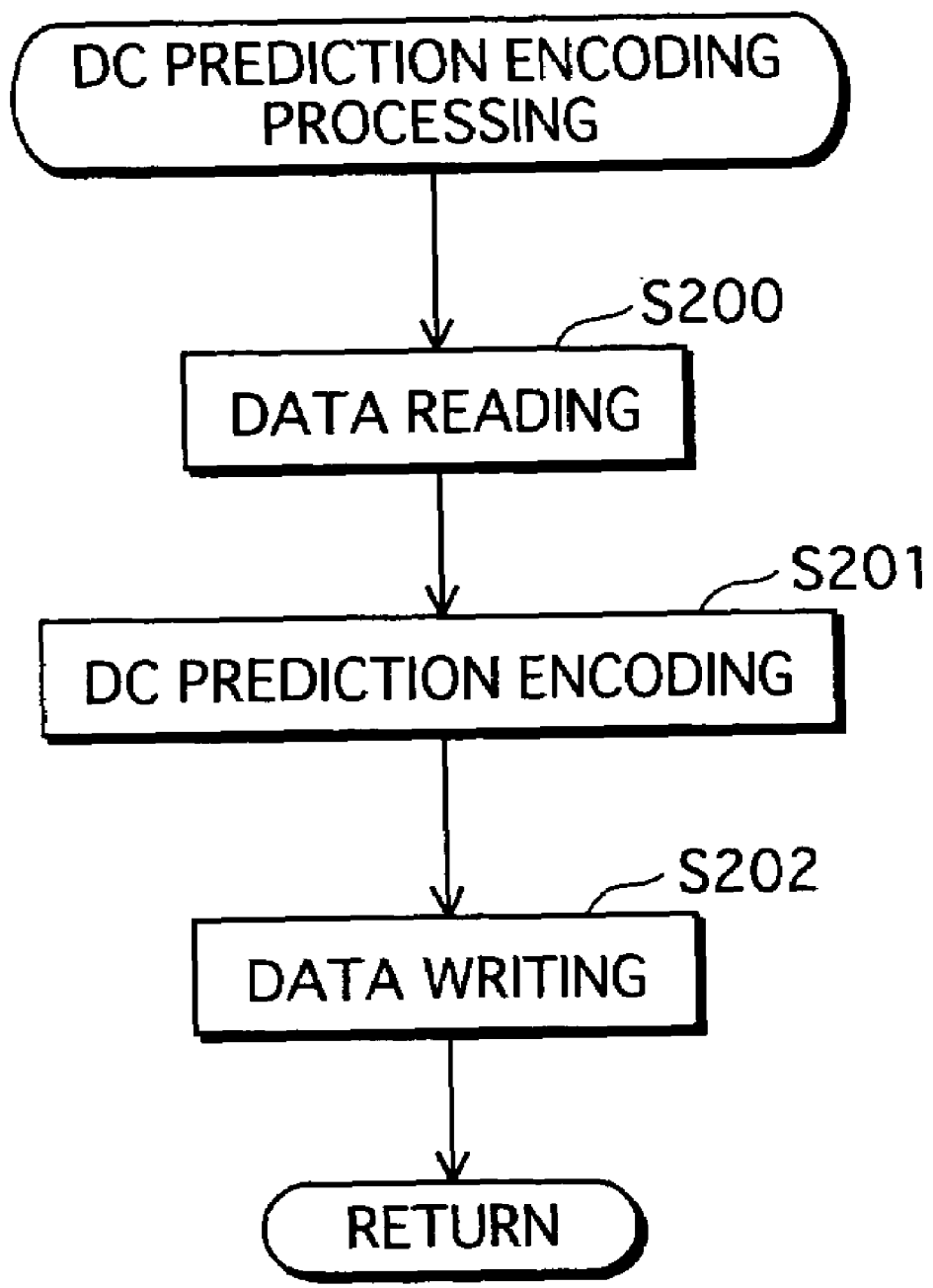
FIG. 6 is a flow chart that shows the flow of the DC prediction encoding processing (Step S102) performed by the image encoding apparatus 1 according to the first embodiment.

FIG. 6 is a flow chart that shows the flow of the DC prediction encoding processing (Step S102) performed by the image encoding apparatus 1. As shown in FIG. 6, in order to perform DC prediction encoding processing, the image encoding apparatus 1 at first reads, from the memory unit 113, DC coefficients of the adjacent blocks that are needed for prediction (Step S200).

Subsequently, using the DC coefficients read from the memory unit 113, the image encoding apparatus 1 performs DC prediction encoding by encoding the difference (a prediction error) between the DC coefficient and the DC coefficient of the prediction block, the difference being calculated as a gradient of these DC coefficients (Step S201), and stores, into the memory unit 113, the DC coefficient of the block being the target of the encoding processing since this DC coefficient will be required for performing prediction encoding on the following blocks (Step S202).

Figure 7:
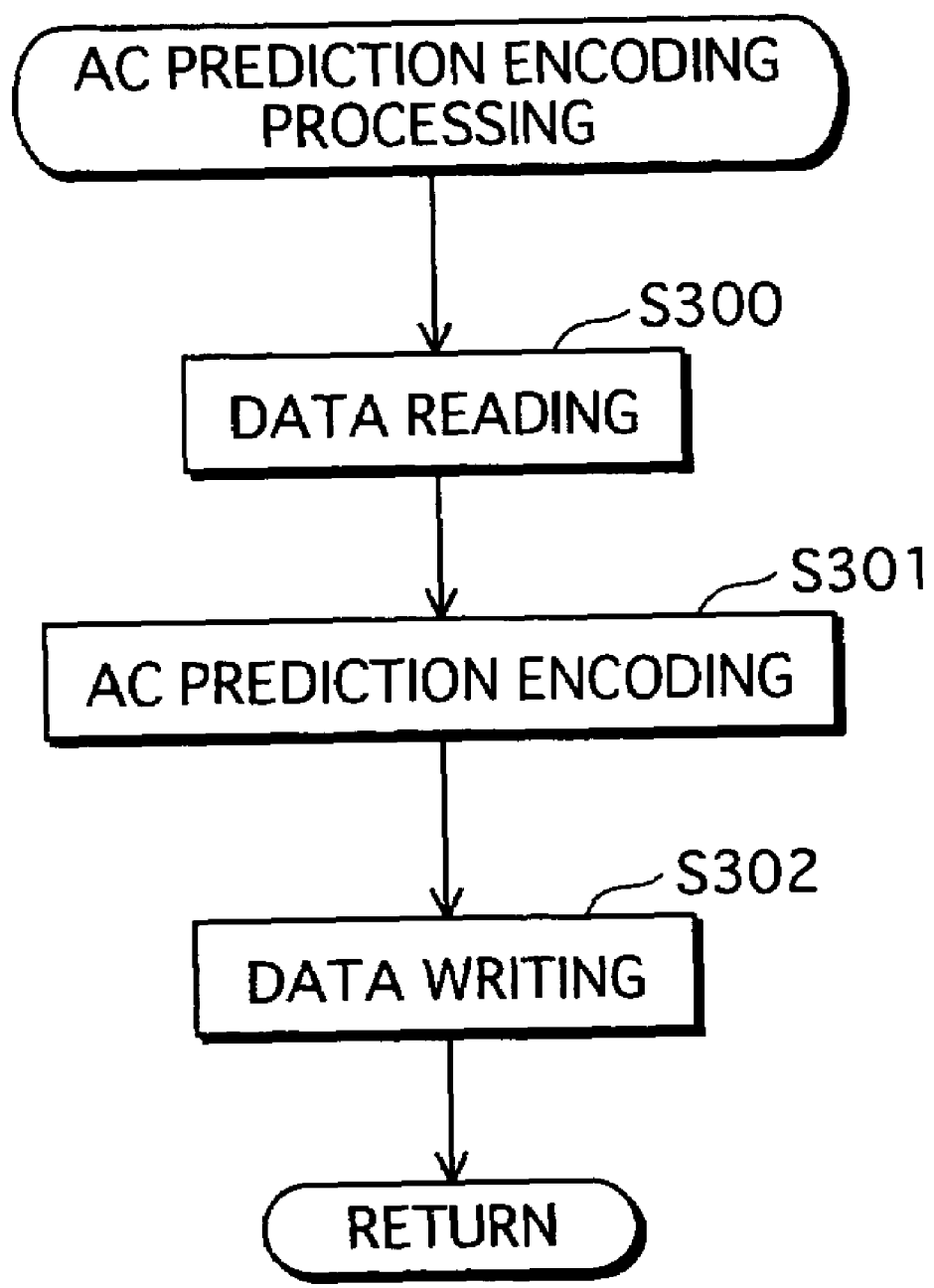
FIG. 7 is a flow chart that shows the flow of the AC prediction encoding processing (Step S105) performed by the image encoding apparatus 1 according to the first embodiment.

FIG. 7 is a flow chart that shows the flow of the AC prediction encoding processing (Step S105) performed by the image encoding apparatus 1. As shown in FIG. 7, in order to perform the AC prediction encoding processing, the image encoding apparatus 1 at first reads, from the memory unit 113, DC coefficients and AC coefficients of the adjacent blocks that are needed for prediction (Step S300).

Subsequently, using the DC coefficients and AC coefficients read from the memory unit 113, the image encoding apparatus 1 performs AC prediction encoding by encoding the differences (prediction errors) between the DC and AC coefficients and the DC and AC coefficients of the prediction block, the differences being calculated as gradients of the DC and AC coefficients (Step S301), and stores, into the memory unit 113, the DC coefficients and AC coefficients of the block being the target of the encoding processing since these coefficients will be required for performing prediction encoding on the following blocks (Step S302).

1-5. The Operation Performed by the Bus Traffic Monitoring Unit 110

The following describes the operation performed by the bus traffic monitoring unit 110.

When the image encoding apparatus 1 processes a moving picture having n frames per second, the bus traffic monitoring unit 110 judges the level of congestion of the memory bus 111 in the manner described below:

At first, the bus traffic monitoring unit 110 calculates the total access amount, S (bytes/frame), to be made to the memory unit 113 via the memory bus 111 during a period corresponding to the one frame to be processed next, using the formula below:

$$S = X_{AC} + X_{others} + X_{offset}$$

where $X_{AC}$ is an access amount to be made in order to perform AC prediction encoding during the period corresponding to one frame; $X_{others}$ is an access amount to be made from the group of processes 112 during a period corresponding to one frame; and $X_{offset}$ is an offset to allow for a margin.

In the present embodiment, a fixed value is used as $X_{AC}$. As for $X_{others}$, as mentioned above, the access amount made from the group of processes 112 during a period corresponding to the immediately preceding frame are counted by monitoring the chip select signals and used as $X_{others}$. Since an $X_{others}$ for the period corresponding to the immediately preceding frame is not necessarily the same as an $X_{others}$ for the following period, the value of $X_{offset}$ is determined by taking the variance between those into account.

The bus traffic monitoring unit 110 calculates the access amount B which is allowable to be made to the memory unit 113 during a period corresponding to one frame, from the bandwidth (bytes/second) of the memory bus 111 and the frame rate n (frames/second) of the moving picture to be processed, using the formula below:

$$B = \text{bandwidth}/\text{frame rate } n$$

When $S \geq B$, the bus traffic monitoring unit 110 judges that the memory bus 111 is congested. When $S < B$, the bus traffic monitoring unit 110 judges that the memory bus 111 is not congested.

1-6. Modification Examples

As for the present embodiment, modification examples as the following are also possible:

(1) In the description above, the bus traffic monitoring unit 110 monitors the memory accesses from the groups of processes 112 by referring to the chip select signals, and judges the level of congestion of the memory bus 111; however, needless to say, the present invention is not limited to this arrangement. It is acceptable to have an arrangement as described below.

The bus traffic monitoring unit 110 may refer to the chip select signals of the memory unit 113 to judge the level of congestion of the memory bus 111. Regardless of what method is used by the bus traffic monitoring unit 110 to judge the level of congestion of the memory bus 111, it is possible, according to the present embodiment, to prevent degradation of image quality, such as a frame drop or other problems, resulting from congestion of the memory bus 111.

(2) It is acceptable to use the following formula for the bus traffic monitoring unit 110 to calculate the total access amount made to the memory unit 113.

$$S = X_{AC} + K^* X_{others} + X_{offset}$$

where K is a constant and is smaller than 1 when the image encoding apparatus 1 prioritizes the image encoding processing over the processing of the group of processes 112. Conversely, K is larger than 1 when the image encoding apparatus 1 prioritizes the processing of the group of processes 112 over the image encoding processing.

For instance, a processing which is large in volume but not urgent (e. g. backing up a file) is performed in parallel with the image encoding processing, it is effective to set K at a value smaller than one. A processing which is small in volume but requires realtime-ness (e. g. audio encoding processing) is performed in parallel with the image encoding processing, it is effective to set K at a value larger than one.

(3) In the present embodiment, the method for the prediction encoding processing can be switched in units of frames; however, it is also acceptable to have an arrangement wherein the method for prediction encoding processing can be switched in units of block lines.

In such a case, the bus traffic monitoring unit 110 may switch the prediction encoding method according to the level of congestion of the memory bus 111 during a period corresponding to the immediately preceding block line. Alternatively, the bus traffic monitoring unit 110 may switch the prediction encoding method according to the level of congestion of the memory bus 111 during a period corresponding to the immediately preceding frame.

In a case where the bus traffic monitoring unit 110 switches between the prediction encoding methods in units of frames, since a same prediction encoding method is used for a period corresponding to at least one frame, even if the level of congestion of the memory bus 111 changes during the period, it is not possible to switch the prediction encoding method being used to the other more appropriate one.

On the other hand, in a case where the bus traffic monitoring unit 110 switches between the prediction encoding methods in units of block lines, since the period in which a same prediction encoding method keeps being used is shorter, it is possible to reduce the risk of using an appropriate prediction encoding method in the event that the level of congestion of the memory bus 111 changes during that period.

2. Second Embodiment

The image encoding apparatus of the second embodiment has generally the same configurations as the image encoding apparatus of the first embodiment except for the criteria to be used to switch the prediction selector. More specifically, in the first embodiment, which one of the prediction encoding methods is to be used is determined according to the level of congestion of the memory bus 111, whereas in the second embodiment, which one of the prediction encoding methods is to be used is determined according to the amount of codes generated in the prediction coding process. The following describes the image encoding apparatus of the second embodiment, with reference to the drawings.

2-1. Configuration of the Apparatus

Figure 8:
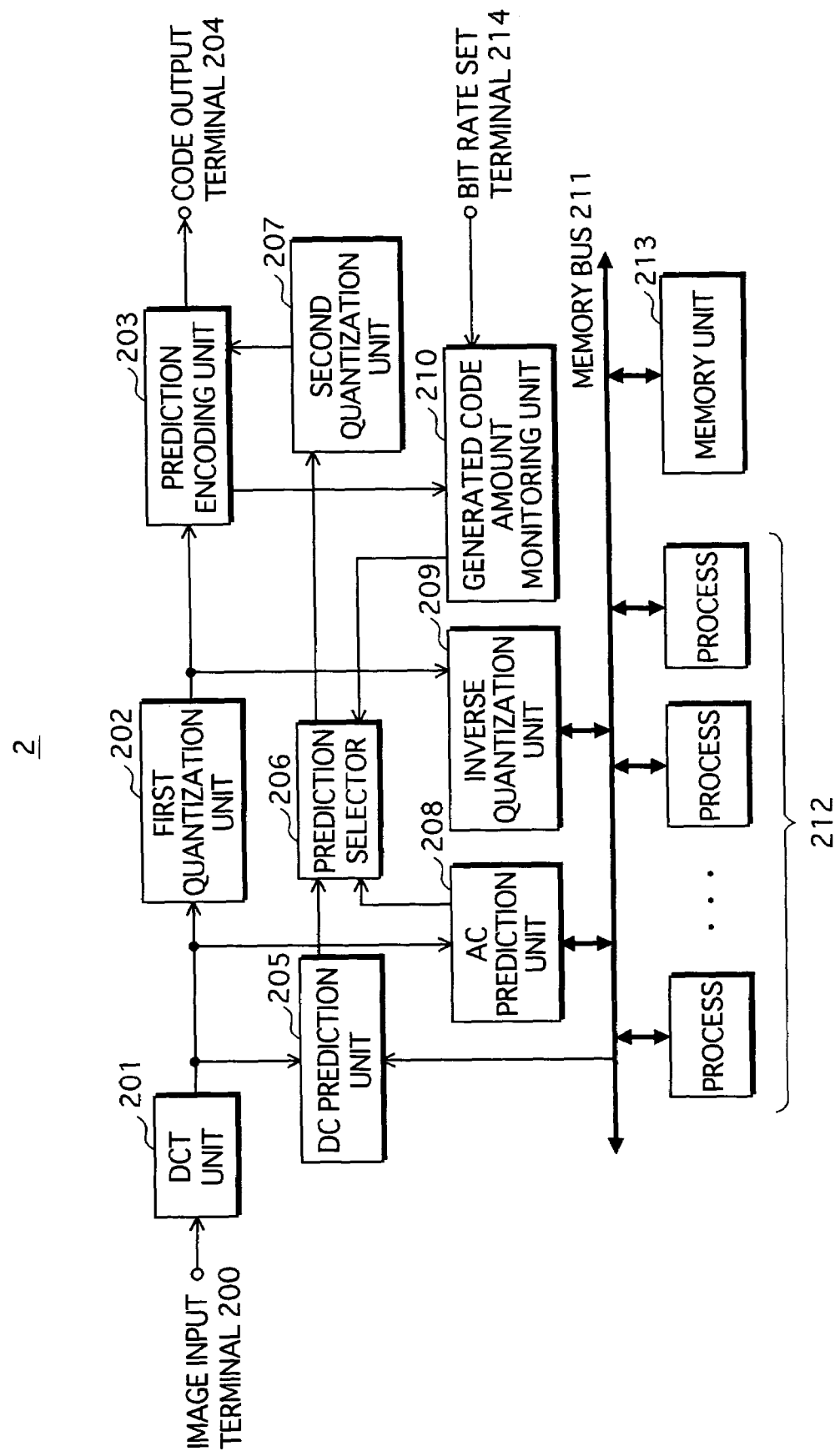
FIG. 8 is a block diagram that shows the principal functional configuration of an image encoding apparatus according to the second embodiment.

FIG. 8 is a block diagram that shows the principal functional configuration of the image encoding apparatus of the present embodiment. As shown in FIG. 8, the image encoding apparatus 2 comprises: an image input terminal 200, a DCT unit 201, a first quantization unit 202, a prediction encoding unit 203, a code output terminal 204, a DC prediction unit 205, a prediction selector 206, a second quantization unit 207, an AC prediction unit 208, an inverse quantization unit 209, a generated code amount monitoring unit 210, a memory bus 211, a group of processes 212, a memory unit 213, and a bit rate set terminal 214.

The bit rate set terminal 214 receives a setting of a target value for the bit rate.

The generated code amount monitoring unit 210 compares the amount of codes per frame corresponding to the bit rate target value received by the bit rate set terminal 214 (hereafter, the amount of codes will be referred to as "the reference code amount") with the amount of codes per frame generated in the prediction encoding processing (hereafter, the amount of codes will be referred to as "generated code amount").

When the generated code amount is larger than the reference code amount, the generated code amount monitoring unit 210 outputs a select signal to the prediction selector 206 so that the output from the AC prediction unit 208 is selected. When AC prediction encoding is used, the compression ratio is higher, the bit rate can therefore be lower. Accordingly, the bit rate becomes low enough to achieve the bit rate target value having been set or can be close to the bit rate target value.

Conversely, when the generated code amount is equal to or smaller than the reference code amount, the generated code amount monitoring unit 210 outputs a select signal to the prediction selector 206 so that the output from the DC prediction unit 205 is selected. With this arrangement, it is possible to shorten the period during which the memory bus 211 is occupied for the prediction encoding processing. Accordingly, it is possible to lower the possibility of having memory access contention occurring between the prediction encoding processing and the processes included in the group of processes 212.

Consequently, by performing control adaptively so that the use of the AC prediction method, which causes a big load to the system, is limited to a requisite minimum level, it is possible to realize the most appropriate prediction encoding processing that is adapted to the state of the system.

2-2. The Operation Performed by the Image Encoding Apparatus 2

Figure 9:
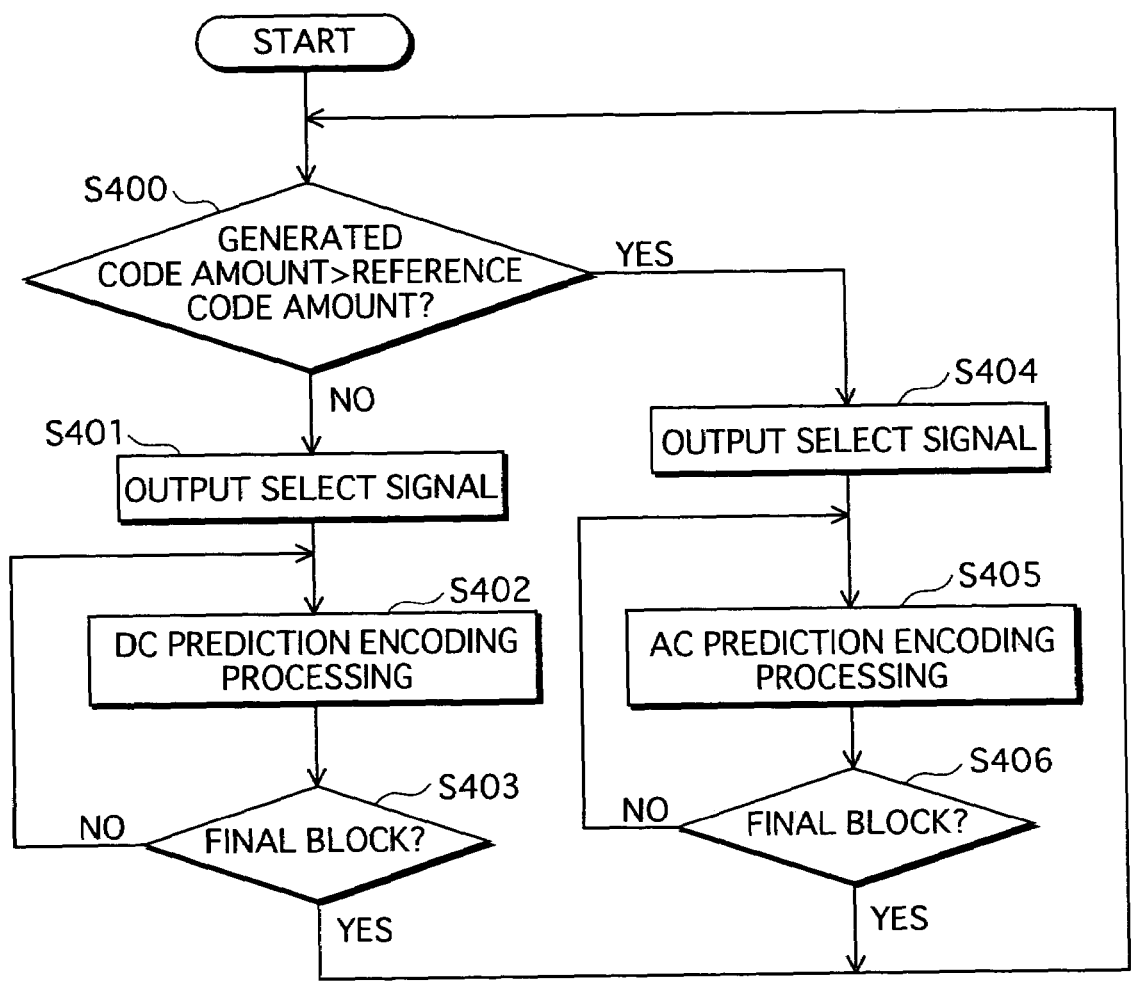
FIG. 9 is a flow chart that shows the flow of the processing performed by the image encoding apparatus 2 according to the second embodiment.

The following describes the operation performed by the image encoding apparatus 2 of the present embodiment. FIG. 9 is a flow chart that shows the flow of the processing performed by the image encoding apparatus 2 of the present embodiment.

As shown in FIG. 9, the image encoding apparatus 2 at first compares the generated code amount for a frame that has been processed immediately previously with the reference code amount. When the generated code amount is larger than the reference code amount (Step S400: YES), the generated code amount monitoring unit 210 outputs a select signal so that the prediction selector 206 selects the output from the AC prediction unit 208 (Step S404).

Subsequently, like the image encoding apparatus 1 of the first embodiment, the image encoding apparatus 2 performs AC prediction encoding processing on each of the blocks constituting a frame (Step S405). Every time the image encoding apparatus 2 completes processing a block, the image encoding apparatus 2 checks if the block is the final block of the frame.

As a result of the checking, when it is judged that the block is not the final block (Step S406: NO), the procedure advances to Step S405 and the image encoding apparatus 2 performs AC prediction encoding processing on the next block. When it is judged that the block is the final block (Step S406: YES), the procedure advances to Step S400, and the image encoding apparatus 2 performs the processing of the next frame.

In a case where the image encoding apparatus 2 has judged that the generated code amount is equal to or smaller than the reference code amount (Step S400: NO), the generated code amount monitoring unit 210 outputs a select signal so that the prediction selector 206 selects the output from the DC prediction unit 205 (Step S401).

In such a case, like the image encoding apparatus 1 of the first embodiment, the image encoding apparatus 2 performs DC prediction encoding processing on each of the blocks constituting a frame (Step S402). Every time the image encoding apparatus 2 completes processing a block, the image encoding apparatus 2 checks if the block is the final block of the frame. When it is judged that the block is not the final block (Step S403: NO), the processing of the image encoding apparatus 2 advances to Step S402. When it is judged that the block is the final block (Step S403: YES), the processing of the image encoding apparatus 2 advances to Step S400.

As explained above, in the present embodiment, the selection of the prediction encoding method to be applied to the next frame is made by referring to the generated code amount of the frame on which prediction encoding has been performed immediately previously; therefore, it is possible to limit the use of the AC prediction encoding method, which causes a big load to the system, to a requisite minimum level. Accordingly, it is possible to realize the most appropriate prediction encoding processing that is adapted to the state of the system.

2-3. Modification Examples

As for the present embodiment, modification examples as the following are also possible:

(1) In the present embodiment, the selection of the prediction encoding method is made depending on whether the generated code amount is larger than the reference code amount; however, it is acceptable to have an arrangement as follows:

The DC prediction encoding processing method may be selected in a case where the generated code amount is larger than a code amount obtained by adding a predetermined amount to the reference code amount. The AC prediction encoding processing method may be selected in a case where the generated code amount is smaller than a code amount obtained by subtracting a predetermined amount from the reference code amount. With these arrangements, it is possible to avoid the situation where switching between the prediction encoding methods occurs too frequently, and to stably perform the prediction encoding processing.

(2) In the present embodiment, the selection of the prediction encoding method is made every time the processing of one frame is completed; however, it is acceptable to have an alternative arrangement wherein the selection is made every time the processing of one block line is completed. With this arrangement, it is possible to use the more appropriate prediction encoding method.

Figure 10:
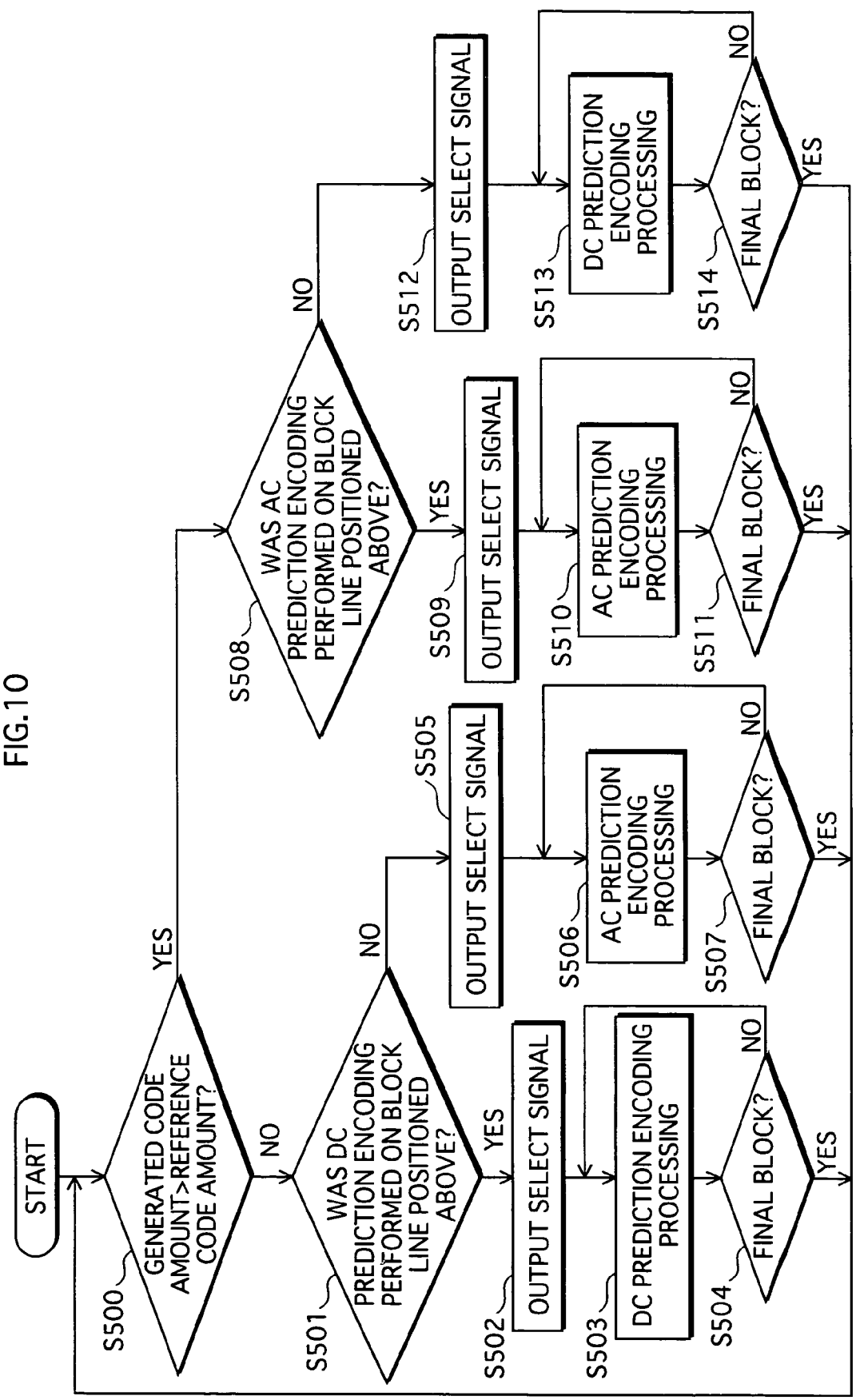
FIG. 10 is a flow chart that shows the flow of the processing performed by an image encoding apparatus according to the modification example (2) of the second embodiment.

FIG. 10 is a flow chart that shows the flow of the processing performed by an image encoding apparatus according to this modification example. As shown in FIG. 10, the image encoding apparatus compares the generated code amount for the block line that has been processed immediately previously (such a block line will be referred to as "the previous block line") with the reference code amount and checks which is larger.

As a result of the checking, when the generated code amount is equal to or smaller than the reference code amount (Step S500: NO), it is checked if the previous block line was processed with the DC prediction encoding processing method. In a case where the previous block line was processed with the DC prediction encoding processing method (Step S501: YES), the generated code amount monitoring unit outputs a select signal so that the output from the DC prediction unit is selected (Step S502).

Subsequently, DC prediction encoding processing is performed in units of blocks (Step S503), and every time the processing of a block is completed, it is checked if the block is the final block of the block line. As a result of the checking, when it is judged that the block is not the final block (Step S504: NO), DC prediction encoding processing is performed on the next block in the block line (Step S503).

When the processed block is the final block (Step S504: YES), the procedure advances to Step S500, and the generated code amount is compared with the reference code amount.

On the other hand, in a case where the previous block line was not processed with the DC prediction encoding processing method (Step S501: NO), the generated code amount monitoring unit outputs a select signal so that the output from the AC prediction unit is selected (Step S505).

Subsequently, AC prediction encoding processing is performed in units of blocks (Step S506), and every time the processing of a block is completed, it is checked if the block is the final block of the block line. As a result of the checking, when it is judged that the block is not the final block (Step S507: NO), DC prediction encoding processing is performed on the next block in the block line (Step S506).

When the processed block is the final block (Step S507: YES), the procedure advances to Step S500, and the generated code amount is compared with the reference code amount.

When the generated code amount is larger than the reference code amount, (Step S500: YES), it is checked if the previous block line was processed with the AC prediction encoding processing method. As a result of the checking, in a case where the previous block line was processed with the AC prediction encoding processing method (Step S508: YES), the generated code amount monitoring unit outputs a select signal so that the output from the AC prediction unit is selected (Step S509).

Subsequently, the image encoding apparatus performs AC prediction encoding processing in units of blocks (Step S510), and when the processing of the final block is completed (Step S511: YES), the procedure advances to step S500, and the generated code amount is compared with the reference code amount.

In a case where the previous block line was not processed with the AC prediction encoding processing method (Step S508: NO), the generated code amount monitoring unit outputs a select signal so that the output from the DC prediction unit is selected (Step S512). DC prediction encoding processing is performed (Step S513), and when the processing of the final block is completed (Step S514: YES), the generated code amount is compared with the reference code amount.

With this arrangement, it is possible to further inhibit changes in the amounts of generated code than in the case where the selection of the prediction encoding method is made in units of frames, and thereby to perform the prediction encoding processing on moving pictures with more appropriate bit rate. Accordingly, even when the bandwidth in which moving pictures are transmitted is limited, it is possible to achieve good image quality. In addition, when there is a room in terms of code amount, it is possible to further enhance the image quality by performing AC prediction encoding processing.

3. Third Embodiment

The image encoding apparatus of the third embodiment has generally the same configurations as the image encoding apparatus of the first embodiment except for the criteria to be used to switch the prediction selector. More specifically, in the first embodiment which one of the prediction encoding methods is to be used is determined according to the level of congestion of the memory bus, whereas in the third embodiment, which one of the prediction encoding method is to be used is determined according to the length of time taken to perform the prediction encoding processing. The following describes the image encoding apparatus of the third embodiment, with reference to the drawings.

3-1. Configuration of the Apparatus

Figure 11:
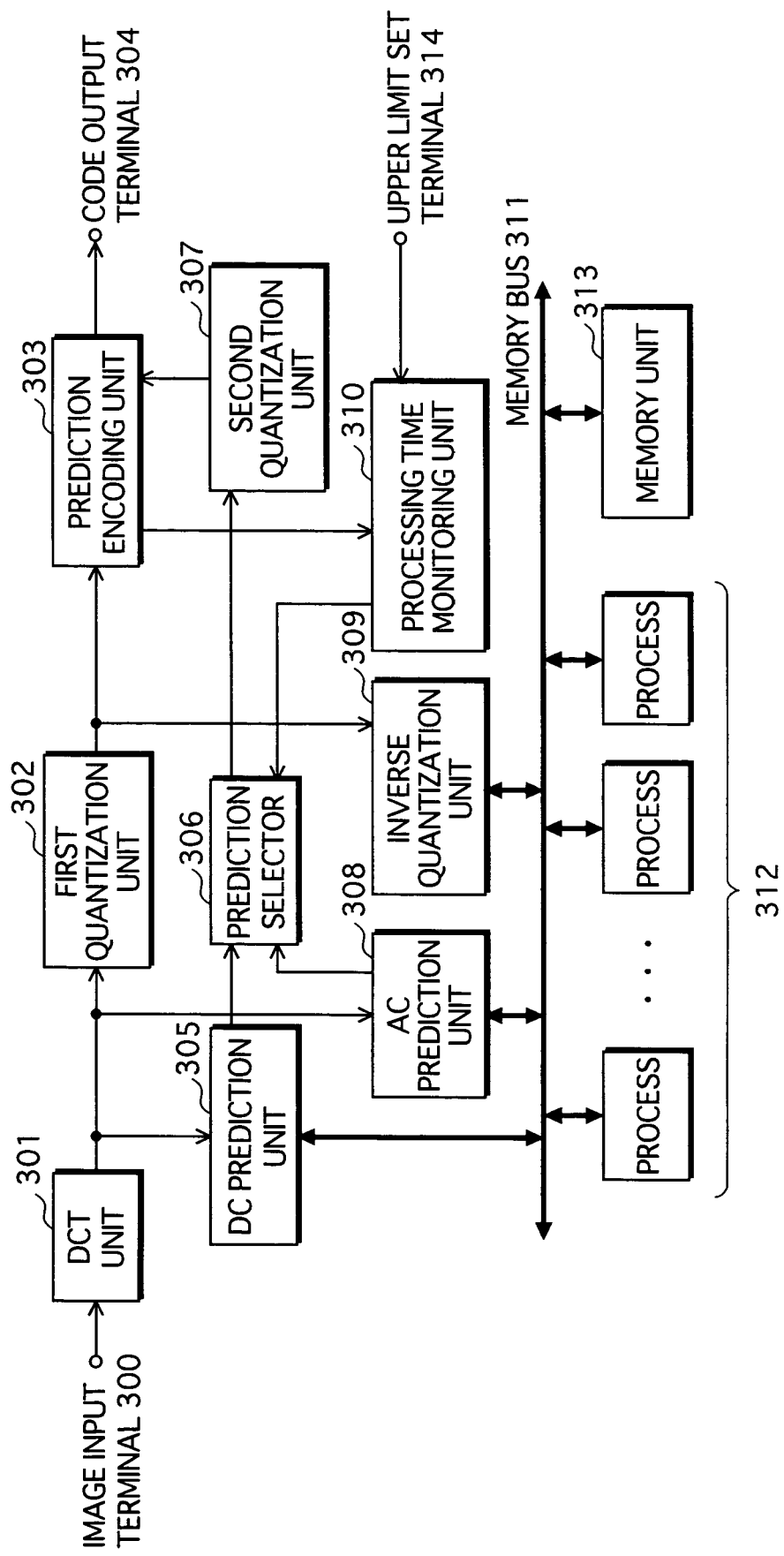
FIG. 11 is a block diagram that shows the principal functional configuration of an image encoding apparatus according to the third embodiment.

FIG. 11 is a block diagram that shows the principal functional configuration of the image encoding apparatus of the present embodiment. As shown in FIG. 11, the image encoding apparatus 3 comprises: an image input terminal 300, a DCT unit 301, a first quantization unit 302, a prediction encoding unit 303, a code output terminal 304, a DC prediction unit 305, a prediction selector 306, a second quantization unit 307, an AC prediction unit 308, an inverse quantization unit 309, a processing time monitoring unit 310, a memory bus 311, a group of processes 312, a memory unit 313, and an upper limit set terminal 314.

The upper limit set terminal 314 receives a setting of an upper limit for the time taken to perform the encoding processing. Here, the time taken to perform the encoding processing means how much time is necessary to process one frame. The setting of an upper limit for the processing time varies depending on the size of an image on which prediction encoding processing is to be performed, the frame rate, or other factors.

For example, when real-time prediction encoding is performed on an image with a relatively low resolution level such as QCIF (176×144) or CIF (352×288), the upper limit will be relatively large. On the other hand, when real-time prediction encoding is performed on an image equal to or larger than VGA (640×480), the upper limit will be relatively small.

Every time prediction encoding processing of one frame is completed, the processing time monitoring unit 310 compares the length of time having been taken to perform the processing with the upper limit received by the upper limit set terminal 314 and outputs a select signal to designate a prediction encoding method.

3-2. The Operation Performed by the Image Encoding Apparatus 3

Figure 12:
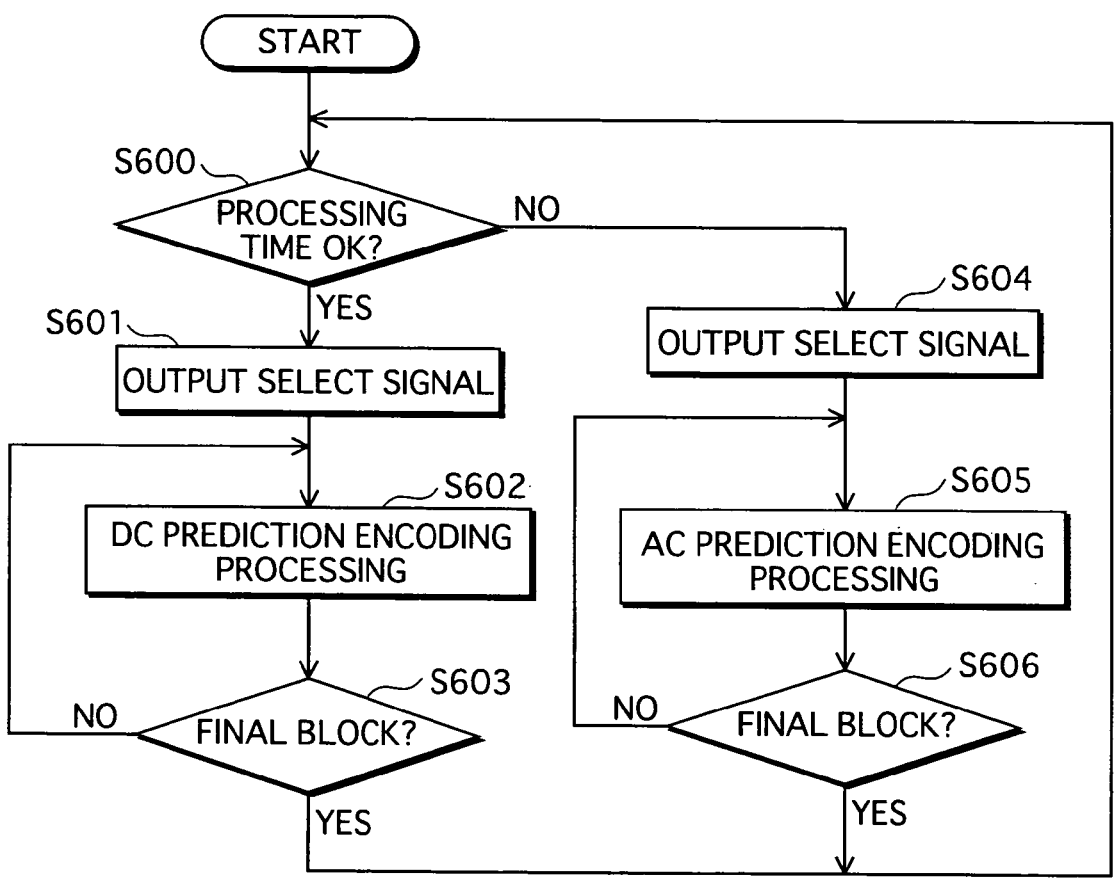
FIG. 12 is a flow chart that shows the processing performed by the image encoding apparatus 3 according to the third embodiment.

FIG. 12 is a flow chart that shows the flow of the processing performed by the image encoding apparatus 3 according to the present embodiment. As shown in FIG. 12, the image encoding apparatus compares the upper limit of processing time with the length of time taken to encode the frame that has been processed immediately previously and checks if the time taken to process the previous frame exceeds the upper limit.

As a result of the checking, when the length of time exceeds the upper limit (Step S600: NO), the processing time monitoring unit 310 outputs a select signal so that the output from the DC prediction unit is selected (Step S601).

Subsequently, DC prediction encoding processing is performed in units of blocks up to the final block of the frame (Step S602), and when the processing of the final block is completed (Step S603: YES), the procedure advances to Step S600 and the processing of the next frame will start.

When the time having been taken to process the previous frame does not exceed the upper limit (Step S600: YES), the processing time monitoring unit outputs a select signal to the prediction selector so that the output from the AC prediction unit is selected (Step S604). Subsequently, AC prediction encoding processing is performed (Step S605), and when the processing of the final block is completed (Step S606: YES), the procedure advances to Step S600.

With this arrangement, it is possible to inhibit the processing time from exceeding a predetermined level and to maintain an appropriate bit rate. Even when the bandwidth in which moving pictures are transmitted is limited, it is possible to prevent degradation of image quality resulting from, for example, a frame drop. In addition, when there is a room in terms of processing time, AC prediction encoding processing is performed; therefore, it is possible to further make the image quality good.

3-3. Modification Examples

In the present embodiment, the selection of the prediction encoding method is made every time the processing of one frame is completed; however, it is acceptable to have an alternative arrangement wherein the selection is made every time the processing of one block line is completed. With the former arrangement, the selection of the prediction encoding method is made in view of relativity between sequential frames, whereas with the latter arrangement, the selection of the prediction encoding method is made in view of relativity between sequential block lines within one frame. In either way, it is possible to make appropriate selection of prediction encoding method.

4. Fourth Embodiment

The image encoding apparatus of the fourth embodiment has generally the same configurations as the image encoding apparatus of the first embodiment except for the configuration for performing DC prediction encoding. More specifically, in the first embodiment, the DC prediction unit 105 refers to the DC coefficients stored in the memory unit 113 via the memory bus 111, whereas in the fourth embodiment, the DC prediction unit uses a dedicated memory. The following describes the image encoding apparatus of the fourth embodiment, with reference to the drawings.

4-1. Configuration of the Apparatus

Figure 13:
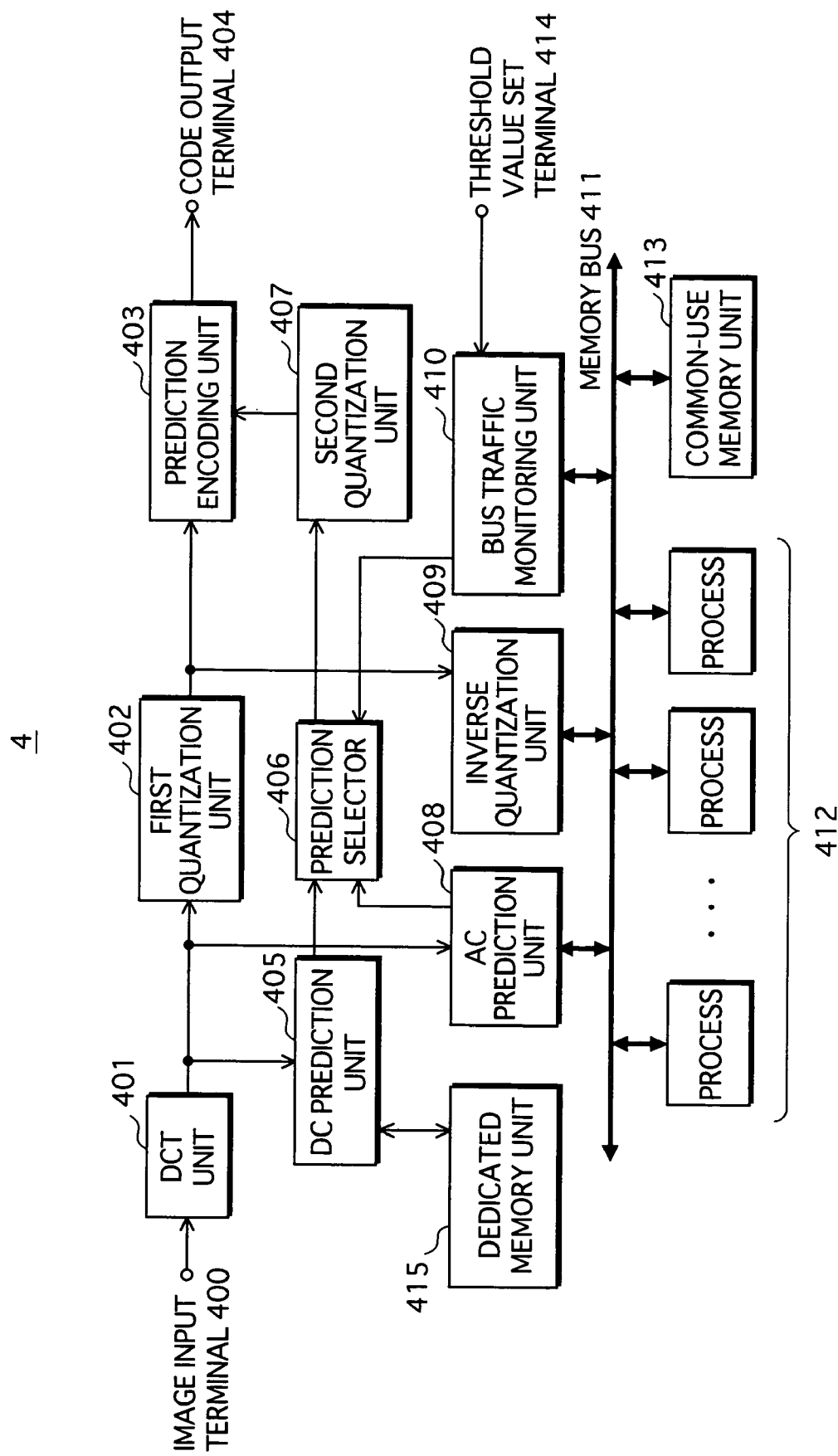
FIG. 13 is a block diagram that shows the principal functional configuration of an image encoding apparatus according to the fourth embodiment.

FIG. 13 is a block diagram that shows the principal functional configuration of the image encoding apparatus of the present embodiment. As shown in FIG. 13, the image encoding apparatus 4 comprises: an image input terminal 400, a DCT unit 401, a first quantization unit 402, a prediction encoding unit 403, a code output terminal 404, a DC prediction unit 405, a prediction selector 406, a second quantization unit 407, an AC prediction unit 408, an inverse quantization unit 409, a bus traffic monitoring unit 410, a memory bus 411, a group of processes 412, a common-use memory unit 413, a bit rate set terminal 414, and a dedicated memory unit 415.

The dedicated memory unit 415 stores therein DC coefficients. The DC prediction unit 405 refers to the DC coefficients stored in the dedicated memory unit 415 and performs DC prediction encoding.

4-2. The Operation Performed by the Image Encoding Apparatus 4

The following describes the operation performed by the image encoding apparatus 4, using, as an example, the case in which the selection of the prediction encoding method is made for each block line.

Figure 14:
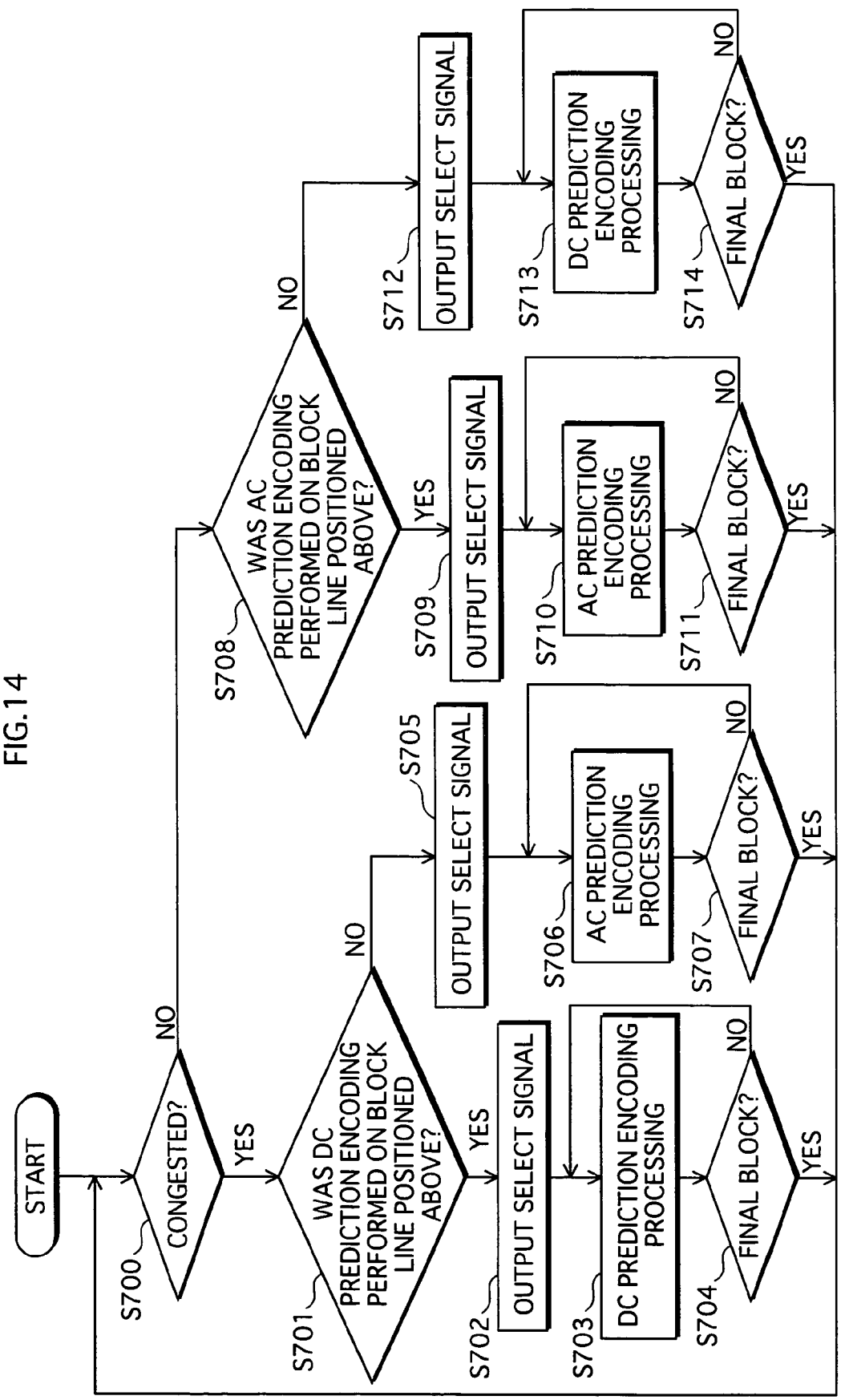
FIG. 14 is a flow chart that shows the processing performed by the image encoding apparatus 4 according to the fourth embodiment.

FIG. 14 is a flow chart that shows the flow of the processing performed by the image encoding apparatus 4. As shown in FIG. 14, the image encoding apparatus 4 compares the generated code amount for the block line that has been processed immediately previously (such a block line will be referred to as "the previous block line") with the reference code amount and checks which is larger.

As a result of the checking, when the bus traffic monitoring unit 410 has judged that the memory bus 411 is congested (Step S700: YES), the image encoding apparatus 4 checks if the previous block line was processed with the DC prediction encoding processing method. In a case where the previous block line was processed with the DC prediction encoding processing method (Step S701: YES), the bus traffic monitoring unit 410 outputs a select signal so that the output from the DC prediction unit is selected (Step S702).

Subsequently, DC prediction encoding processing is performed in units of blocks (Step S703), and every time the processing of a block is completed, it is checked if the block is the final block of the block line. As a result of the checking, when it is judged that the block is not the final block (Step S704: NO), DC prediction encoding processing is performed on the next block in the block line (Step S703).

When the processed block is the final block (Step S704: YES), the procedure advances to Step S700, and the level of congestion of the memory bus 411 is checked.

On the other hand, in a case where the previous block line was not processed with the DC prediction encoding processing method (Step S701: NO), the bus traffic monitoring unit 410 outputs a select signal so that the output from the AC prediction unit 408 is selected (Step S705).

Subsequently, AC prediction encoding processing is performed in units of blocks (Step S706), and every time the processing of a block is completed, it is checked if the block is the final block of the bock line. As a result of the checking, when it is judged that the block is not the final block (Step S707: NO), AC prediction encoding processing is performed on the next block in the block line (Step S706).

When the processed block is the final block (Step S707: YES), the procedure advances to Step S700, and the generated code amount is compared with the reference code amount.

When the bus traffic monitoring unit 410 has judged that the memory bus 411 is congested (Step S700: NO), it is checked if the previous block line was processed with the AC prediction encoding processing method. As a result of the checking, when the previous block line was processed with the AC prediction encoding processing method (Step S708: YES), the bus traffic monitoring unit 410 outputs a select signal so that the prediction selector 406 selects the output from the AC prediction unit 408 (Step S709).

Subsequently, the image encoding apparatus 4 performs AC prediction encoding processing in units of blocks (Step S710), and when the processing of the final block is completed (Step S711: YES), the level of congestion of the memory bus 411 is checked.

When the previous block line was not processed with the AC prediction encoding processing method (Step S708: NO), the bus traffic monitoring unit 410 outputs a select signal so that the prediction selector 406 selects the output from the DC prediction unit 405 (Step S712), and DC prediction encoding processing is performed (Step S713). When the processing of the final block is completed (Step S714: YES), the generated code amount is compared with the reference code amount.

With this arrangement described above, when DC prediction encoding is performed, no access via the memory bus 411 is made to the common-use memory unit 413; therefore, it is possible to avoid the situation where the encoding processing is delayed due to memory accesses from other processes or where those other processes are delayed.

It should be noted that the configuration to include the dedicated memory unit 415 can be applied, not only to the case where the bus traffic monitoring unit 410 monitors the level of congestion of the memory bus 411, but also to the case where the prediction encoding method is switched as a result of monitoring of the generated code amount or the processing time, and the effects can be achieved in those cases as well.

5. Modification Examples

The present invention has been explained so far with the examples of embodiments; however, the present invention is not limited to the above embodiments, needless to say. Modification examples described below are also possible as embodiments of the present invention.

(1) Although the description above does not particularly mention it, it is acceptable to select a prediction encoding method in the following way, along with the manner of selecting a prediction encoding method as described above.

It is acceptable to have an arrangement wherein when the prediction errors for AC coefficients are larger than the AC coefficients themselves, the DC prediction encoding method is used, and otherwise the AC prediction encoding method is used. With this arrangement, it is possible to improve the efficiency of encoding.

This kind of selection of a prediction encoding method is called adaptive AC coefficient prediction and defined by the MPEG-4 standard. In other words, the present invention makes it possible to improve the image quality of moving pictures on which compression/encoding is performed in compliance with the MPEG-4 standard.

For example, for each of macro-blocks, the sum of absolute values of the AC coefficients for the block is compared with the sum of absolute values of the prediction errors of the macro-block. When the sum of the absolute values of the AC coefficients is larger, prediction encoding is performed with the use of the prediction errors. When the sum of the absolute values of the AC coefficients is smaller, DC prediction is performed. With this arrangement, it is possible to improve the encoding efficiency of intra-frame prediction encoding processing.

(2) Another modification example of switching between prediction encoding methods is described. It is acceptable to make judgment of whether the prediction encoding method should be switched every time the processing of one frame is completed, or alternatively, every time the processing of one block line or one macro-block is completed.

Generally speaking, the higher the frequency of making judgment against the switching criteria is, the more appropriately the selection of the prediction encoding method can be made; however, the judgment processing can make the processing load larger. Thus, it is important to determine the frequency of judgment while tradeoffs between these two factors are taken into account.

(3) Although the description of the embodiments above did not mention monitoring the criteria for switching between prediction encoding methods, it is acceptable to have an arrangement wherein the criteria are monitored for each of frame periods, or for each of block line periods.

Generally speaking, the shorter the period to monitor the switching criteria is, the more appropriately the switching between the prediction encoding methods can be performed; however, the monitoring processing can make the processing load larger. Thus, it is important to determine the period of monitoring while tradeoffs between these two factors are taken into account.

It should be noted that the period for the monitoring does not have to match the frequency of making judgment against the switching criteria. An appropriate value should be selected for each image encoding apparatus to which the present invention is applied.

6. Example of Application

The image encoding apparatus of the present invention can be applied to a digital still camera (DSC), a digital video camera (DVC), a portable phone with a camera, a TV-conference system, or the like.

Among these examples, when the present invention is applied to a DSC or a DVC, it is possible to overcome inconvenience such as delay of other kinds of processing caused by the load from image encoding processing.

In particular, in an image processing system, e. g. a hi-vision TV, that deals with images with a high resolution level, the amount of processing required for various kinds of processing other than image compression is extremely large. The load on the system is inevitably large even only with those other kinds of processing. Consequently, the present invention is very effective since it realizes encoding processing with which the influence upon other kinds of processing is reduced to the smallest level possible.

When the present invention is applied to a portable phone with a camera or a TV-conference system, it is possible to maintain the communication bandwidth to be used for transmitting moving pictures. Consequently, it is possible to avoid degradation of image quality resulting from, for example, a frame drop.

As another example to which the present invention is applied, the following describes an image sensor system that includes an image encoding apparatus according to the present invention.

Figure 15:
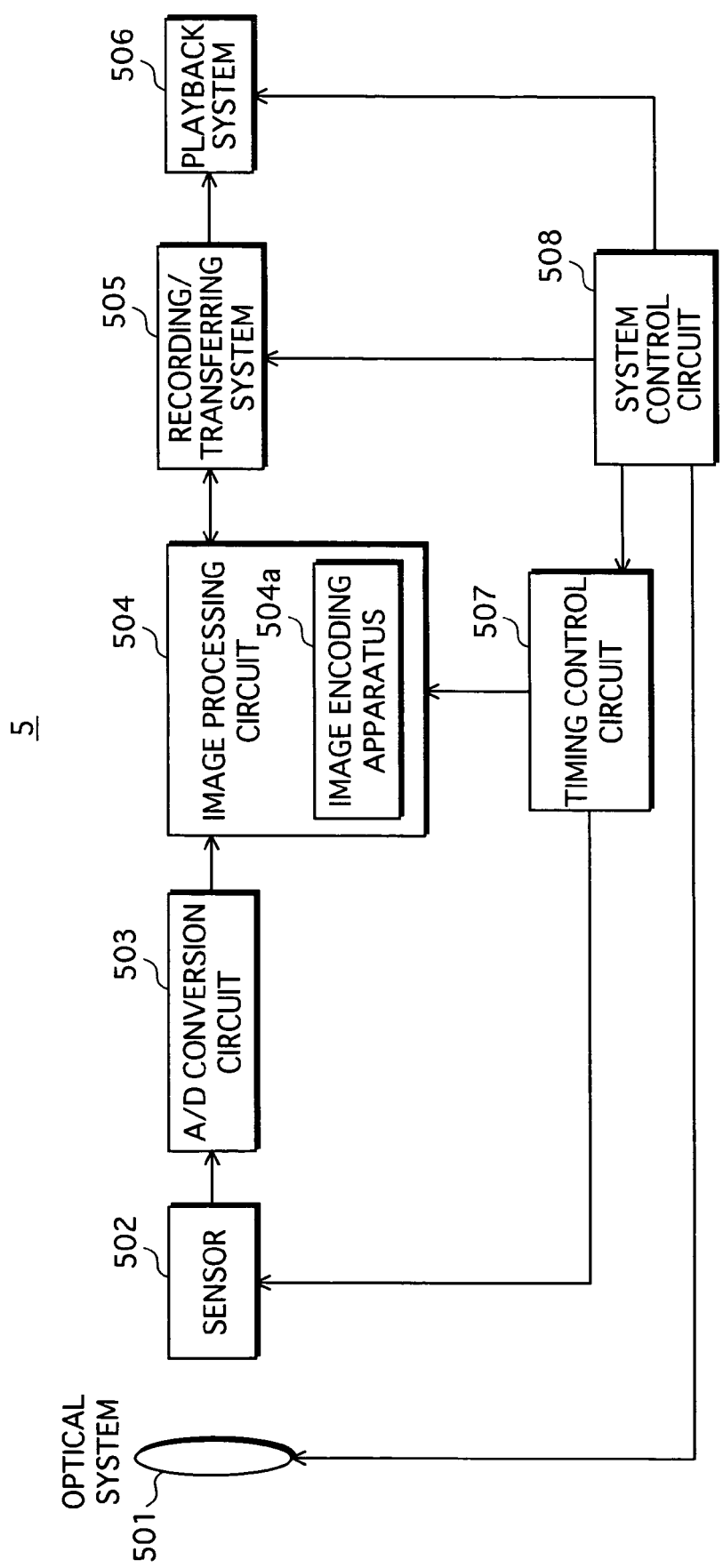
FIG. 15 is a drawing that shows the configuration of an image sensor system to which an image encoding apparatus of the present invention is applied.

FIG. 15 is a drawing that shows the configuration of an image sensor system to which an image encoding apparatus of the present invention is applied. As shown in FIG. 15, the image sensor system 5 comprises an optical system 501, a sensor 502, an A/D conversion circuit 503, an image processing circuit 504, a recoding/transferring system 505, a playback system 506, a timing control circuit 507, and a system control circuit 508. The image processing circuit 504 includes the image encoding apparatus 504a according to the present invention.

The optical system 501 forms an image on the sensor 502 with incident light from the target object. The sensor 502 converts the incident light to analog image signals. The A/D conversion circuit 503 converts the analog image signals to digital image signals. The image processing circuit 504 performs Y/C processing, edge processing, enlargement and reduction of images, or image processing according to JPEG or MPEG, on a digital image expressed by the digital image signals. The recoding/transferring system 505 records on a medium or transfers the processed digital image signals. The playback system 506 plays back the digital image signals that have been recorded or transferred.

The timing control circuit 507 controls the operational timing of the sensor 502 and the image processing circuit 504. The system control circuit 508 controls the optical system 501, the recording/transferring system 505, the playback system 506, and the timing control circuit 507.

In addition to such an image sensor system, the present invention may be applied to a system, e. g. a hi-vision TV, that receives image signals from the outside, instead of from an optical system or a sensor, and processes the image signals. In such a case, in a system that receives analog image signals, the processing is performed after such analog image signals are converted to digital image signals. In a system that receives digital image signals in compliance with a standard such as ITU-R Rec. 601 or ITU-R Rec. 656, image processing can be performed immediately without the need to perform the A/D conversion.

As explained above, according to the present invention, regardless of whether prediction encoding is performed on a still image or moving pictures, it is possible to prevent delay of other kinds of processing and to improve image quality.

Further, according to the present invention, it is possible to limit the use of the AC prediction encoding method to a requisite minimum level. Since the AC prediction encoding method has a high electric power consumption in order to achieve a target bit rate, the present invention is useful for devices such as a mobile camera which requires reduction of electric power consumption.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image encoding apparatus comprising:
    a memory that is commonly used for both encoding processing and other kinds of processing;
    a monitoring unit operable to monitor an amount of accesses to the memory;
    a selecting unit operable to select, according to a result of the monitoring performed by the monitoring unit, one of a direct-current prediction encoding method and an alternating-current prediction encoding method and to select the direct-current prediction encoding method in a case where the monitoring unit judges that the amount of the accesses to the memory is equal to or larger than a value and to select the alternating-current prediction encoding method in a case where the monitoring unit judges that the amount of the accesses to the memory is smaller than the value;
    a DC prediction encoding unit operable to, when the direct-current prediction encoding method is selected, perform direct-current prediction encoding for each of blocks constituting a piece of image data; and
    an AC prediction encoding unit operable to, when the alternating-current prediction encoding method is selected, perform alternating-current prediction encoding for each of blocks constituting a piece of image data.

2. The image encoding apparatus of claim 1, wherein the AC prediction encoding unit performs alternating-current prediction encoding using AC coefficients stored in the memory.

3. The image encoding apparatus of claim 1, wherein the monitoring unit monitors the amount of codes generated by the AC prediction encoding unit and the DC prediction encoding unit, and
    the selecting unit selects the alternating-current prediction encoding method in a case where the monitoring unit judges that the amount of the generated codes is equal to or larger than a value and selects the direct-current prediction encoding method in a case where the monitoring unit judges that the amount of the generated codes is smaller than the value.

4. The image encoding apparatus of claim 1, wherein the monitoring unit monitors a length of time having been taken to encode a predetermined amount of image data, and
    the selecting unit selects the direct-current prediction encoding method in a case where the monitoring unit judges that the length of time is equal to or longer than a value and selects the alternating-current prediction encoding method in a case where the monitoring unit judges that the length of time is shorter than the value.

5. The image encoding apparatus of claim 1, wherein the monitoring unit monitors the amount of the accesses to the memory for each of frame periods.

6. The image encoding apparatus of claim 1, wherein the monitoring unit monitors the amount of the accesses to the memory for each of block line periods.

7. The image encoding apparatus of claim 1, wherein the selecting unit makes the selection of the one of the direct-current and alternating-current prediction encoding methods for each of frames.

8. The image encoding apparatus of claim 1, wherein the selecting unit makes the selection of the one of the direct-current and alternating-current prediction encoding methods for each of block lines.

9. The image encoding apparatus of claim 1, wherein the selecting unit makes the selection of the one of the direct-current and alternating-current prediction encoding methods for each of macro-blocks.

10. The image encoding apparatus of claim 1, comprising a dedicated memory that is used only by the DC prediction encoding unit, wherein
the DC prediction encoding unit performs direct-current prediction encoding using DC coefficients stored in the dedicated memory.

11. An image encoding method to be used by an image encoding apparatus, comprising:
a monitoring step of monitoring an amount of accesses to a memory which is commonly used for both encoding processing and other kinds of processing;
a selecting step of selecting, according to the amount of the accesses to the memory, one of a direct-current prediction encoding method and an alternating-current prediction encoding method and selecting the direct-current prediction encoding method in a case where the amount of the accesses to the memory monitored by the monitoring step is equal to or larger than a value and selecting the alternating-current prediction encoding method in a case where the amount of the accesses to the memory is smaller than the value;
a DC prediction encoding step of, when the direct-current prediction encoding method is selected, performing direct-current prediction encoding for each of blocks constituting a piece of image data; and
an AC prediction encoding step of, when the alternating-current prediction encoding method is selected, performing alternating-current prediction encoding for each of blocks constituting a piece of image data.

12. An image sensor system comprising:
a memory that is commonly used for both encoding processing and other kinds of processing;
an image forming unit operable to form an image of an object;
a photoelectric converting unit operable to perform a photoelectric conversion on the image of the object and output an analog image signal;
an A/D converting unit operable to convert the analog image signal into a digital image signal; and
an image processing unit that is operable to process the digital image signal and includes:
a selecting subunit operable to select, according to an amount of the accesses to the memory, one of a direct-current prediction encoding method and an alternating-current prediction encoding method and to select the direct-current prediction encoding method in a case where the amount of the accesses to the memory is equal to or larger than a value and to select the alternating-current prediction encoding method in a case where the monitoring unit judges that the amount of the accesses to the memory is smaller than the value;
a DC prediction encoding subunit operable to, when the direct-current prediction encoding method is selected, perform direct-current prediction encoding for each of blocks constituting the digital image signal; and
an AC prediction encoding subunit operable to, when the alternating-current prediction encoding method is selected, perform alternating-current prediction encoding for each of blocks constituting the digital image signal.

13. An image processing system comprising:
a memory that is commonly used for both encoding processing and other kinds of processing;
an A/D converting unit operable to receive an analog image signal and convert the received analog image signal into a digital image signal; and
an image processing unit that is operable to process the digital image signal and includes:
a selecting subunit operable to select, according to an amount of the accesses to the memory, one of a direct-current prediction encoding method and an alternating-current prediction encoding method and to select the direct-current prediction encoding method in a case where the amount of the accesses to the memory is equal to or larger than a value and to select the alternating-current prediction encoding method in a case where the monitoring unit judges that the amount of the accesses to the memory is smaller than the value;
a DC prediction encoding subunit operable to, when the direct-current prediction encoding method is selected, perform direct-current prediction encoding for each of blocks constituting the digital image signal; and
an AC prediction encoding subunit operable to, when the alternating-current prediction encoding method is selected, perform alternating-current prediction encoding for each of blocks constituting the digital image signal.

* * * * *